US008729167B2

(12) United States Patent
Thiele et al.

(10) Patent No.: US 8,729,167 B2
(45) Date of Patent: *May 20, 2014

(54) MODIFIED ELASTOMERIC POLYMERS

(75) Inventors: Sven Thiele, Halle (DE); Evemarie Hamann, Halle (DE); Joachim Kiesekamp, Schkopau (DE)

(73) Assignee: Styron Europe GmbH, Horgen (CH)

( * ) Notice: Subject to any disclaimer, the term of this patent is extended or adjusted under 35 U.S.C. 154(b) by 533 days.

This patent is subject to a terminal disclaimer.

(21) Appl. No.: 12/996,200

(22) PCT Filed: May 29, 2009

(86) PCT No.: PCT/US2009/045553
§ 371 (c)(1),
(2), (4) Date: Dec. 3, 2010

(87) PCT Pub. No.: WO2009/148932
PCT Pub. Date: Dec. 10, 2009

(65) Prior Publication Data
US 2011/0082253 A1    Apr. 7, 2011

Related U.S. Application Data

(60) Provisional application No. 61/059,278, filed on Jun. 6, 2008.

(51) Int. Cl.
*C08K 5/24* (2006.01)

(52) U.S. Cl.
USPC ........................................ 524/262; 525/332.6

(58) Field of Classification Search
USPC ........................................ 524/262; 525/332.6
See application file for complete search history.

(56) References Cited

U.S. PATENT DOCUMENTS

| 3,078,254 A | 2/1963 | Zelinski et al. |
| 3,244,664 A | 4/1966 | Zelinski et al. |
| 3,281,383 A | 10/1966 | Zelinski et al. |
| 3,629,213 A | 12/1971 | Onishi et al. |
| 3,692,874 A | 9/1972 | Farrar et al. |
| 3,951,936 A | 4/1976 | Hanlon |
| 3,978,103 A | 8/1976 | Meyer-Simon et al. |
| 4,048,206 A | 9/1977 | Voronkov et al. |
| 4,474,908 A | 10/1984 | Wagner |
| 4,616,069 A | 10/1986 | Watanabe et al. |
| 4,689,368 A | 8/1987 | Jenkins |
| 4,931,376 A | 6/1990 | Ikematsu et al. |
| 5,086,136 A | 2/1992 | Takashima et al. |
| 5,089,574 A | 2/1992 | Castner |
| 5,134,199 A | 7/1992 | Hattori et al. |
| 5,218,023 A | 6/1993 | Horikawa et al. |
| 5,448,002 A | 9/1995 | Castner |
| 5,502,131 A | 3/1996 | Antkowiak et al. |
| 5,753,579 A | 5/1998 | Jalics et al. |
| 5,753,761 A | 5/1998 | Sandstrom et al. |
| 5,786,441 A | 7/1998 | Lawson et al. |
| 5,792,820 A | 8/1998 | Lawson et al. |
| 5,834,573 A | 11/1998 | Castner |
| 5,866,650 A | 2/1999 | Lawson et al. |
| 5,916,961 A | 6/1999 | Hergenrother et al. |
| 5,959,048 A | 9/1999 | Lawson et al. |
| 6,018,007 A | 1/2000 | Lynch |
| 6,025,450 A | 2/2000 | Lawson et al. |
| 6,046,288 A | 4/2000 | Lawson et al. |
| 6,080,835 A | 6/2000 | Lawson et al. |
| 6,103,842 A | 8/2000 | Halasa et al. |
| 6,177,519 B1 | 1/2001 | Chung et al. |
| 6,184,168 B1 | 2/2001 | Lynch |
| 6,229,036 B1 | 5/2001 | Batz-Sohn et al. |
| 6,310,152 B1 | 10/2001 | Castner |
| 6,489,415 B2 | 12/2002 | Hsu et al. |
| 6,608,145 B1 | 8/2003 | Lin et al. |
| 6,627,715 B2 | 9/2003 | Halasa et al. |
| 6,693,160 B1 | 2/2004 | Halasa et al. |
| 6,777,569 B1 | 8/2004 | Westmeyer et al. |
| 2003/0065114 A1 | 4/2003 | Castner |
| 2005/0124740 A1 | 6/2005 | Klockmann et al. |

FOREIGN PATENT DOCUMENTS

| DE | 237 513 A1 | 7/1981 |
| DE | 242 232 A1 | 7/1981 |
| DE | 236 321 A1 | 11/1981 |
| EP | 0 593 049 A1 | 10/1993 |
| EP | 0 924 214 A2 | 11/1998 |
| EP | 0 964 008 A1 | 6/1999 |
| EP | 1 367 069 A1 | 5/2003 |
| EP | 1199313 B1 | 8/2005 |
| JP | 11-301794 | 11/1999 |
| RU | 2 243 239 C2 | 2/2008 |
| WO | WO 96/37547 A2 | 11/1996 |
| WO | WO 02/24764 A1 | 3/2002 |
| WO | WO 2007/047943 A2 | 4/2007 |
| WO | WO 2008/130782 A1 | 10/2008 |
| WO | WO 2009/077837 A1 | 6/2009 |
| WO | WO 2009/148932 A1 | 12/2009 |
| WO | WO 2010/056694 A1 | 5/2010 |
| WO | WO 2011/076377 A1 | 6/2011 |
| WO | WO 2011/079922 A1 | 7/2011 |

OTHER PUBLICATIONS

Official Action, Russian Patent Application No. 2010153583/5(077500), dated Apr. 19, 2013, p. 1-20, Patent Office of the Russian Federation, Russia.
PCT Search Report mailed Oct. 20, 2010 for corresponding PCT Application No. PCT/US2009/045553.
Written Opinion of the International Searching Authority for corresponding PCT Application No. PCT/US2009/045553.

*Primary Examiner* — Peter D Mulcahy
(74) *Attorney, Agent, or Firm* — Brinks Gilson & Lione

(57) ABSTRACT

This disclosure generally relates to chain end modified elastomeric polymers and branched modified elastomeric polymers, their use in the preparation of elastomeric compositions, and articles prepared from chain end modified elastomeric polymers and branched modified elastomeric polymers. An elastomeric polymer composition is provided including the reaction product of at least a living anionic elastomeric polymer, a silane modifier compound, and a modifier compound.

32 Claims, No Drawings

MODIFIED ELASTOMERIC POLYMERS

REFERENCE TO RELATED APPLICATIONS

This application is a National Stage of International Application PCT/US2009/045553 filed May 29, 2009, which claims the benefit of the filing date under 35 U.S.C. §119(e) of Provisional U.S. Patent Application Ser. No. 61/059,278, filed Jun. 6, 2008. The entirety of both applications is hereby incorporated by reference.

FIELD OF THE INVENTION

This invention generally relates to "chain end modified" elastomeric polymers and "branched modified" elastomeric polymers, their use in the preparation of elastomeric compositions, and articles prepared from the same. The invention specifically relates to the use of at least one type of so called "silanes" for the modification of "living" anionic elastomeric polymers, to form a modified branched elastomeric polymer fraction, and the use of at least a second type of modifier compound for the modification of "living" anionic elastomeric polymers to form a linear modified elastomeric polymer fraction. The invention also relates to a modified polymer composition containing the "chain-end modified" elastomeric polymers and "modified branched" elastomeric polymers. The modified positions of the polymer are also called "end caps" in chain end modified polymers, and "central caps" in the branched modified polymers. The "chain end modified" and "modified branched" elastomeric polymers are each reactive with unsaturated portions of an elastomeric polymer backbone (the backbone of the modified elastomeric polymer or another polymer backbone present in an elastomeric composition) and/or with fillers or other components present in an elastomeric composition. These modified elastomeric compositions are useful in the preparation of vulcanized, and thus cross-linked, elastomeric compositions having relatively low hysteresis loss. Such compositions are useful in many articles, including tire treads having low rolling resistance in combination with a good balance of other desirable physical and chemical properties, for example, wet skid properties, abrasion resistance, tensile strength and processability.

BACKGROUND OF THE INVENTION

It is generally accepted, that increasing oil prices and national countries' legislations that require the reduction of automotive carbon dioxide emissions force tire and rubber producers to contribute to produce "fuel efficient," and thus fuel or gas saving tires. One general approach to obtain fuel efficient tires is to produce tire formulations that have reduced hysteresis loss. A major source of hysteresis in vulcanized elastomeric polymers is believed to be attributed to free polymer chain ends, that is, the section of the elastomeric polymer chain between the last cross-link and the end of the polymer chain. This free end of the polymer does not participate in any efficient elastically recoverable process, and as a result, any energy transmitted to this section of the polymer is lost. This dissipated energy leads to a pronounced hysteresis under dynamic deformation. Another source of hysteresis in vulcanized elastomeric polymers is believed to be attributed to an insufficient distribution of filler particles in the vulcanized elastomeric polymer composition. The hysteresis loss of a cross-linked elastomeric polymer composition is related to its Tan δ, at 60° C., value (see ISO 4664-1:2005; Rubber, Vulcanized or thermoplastic; Determination of dynamic properties—part 1: General guidance). In general, vulcanized elastomeric polymer compositions having relatively small Tan δ values, at 60° C., are preferred as having lower hysteresis loss. In the final tire product, this translates to a lower rolling resistance and better fuel economy.

One generally accepted approach to reducing hysteresis loss is to reduce the number of free chain ends of elastomeric polymers. Various techniques are described in the open literature including the use of "coupling agents," such as tin tetrachloride, which may functionalize the polymer chain end and react with components of an elastomeric composition, such as for example with a filler or with unsaturated portions of a polymer. Examples of such techniques, along with other documents of interest, are described in the following patents: U.S. Pat. Nos. 3,281,383; 3,244,664 and 3,692,874 (for example, tetrachlorosilane); U.S. Pat. No. 3,978,103; U.S. Pat. Nos. 4,048,206; 4,474,908; U.S. Pat. No. 6,777,569 (blocked mercaptosilanes) and U.S. Pat. No. 3,078,254 (a multi-halogen-substituted hydrocarbon such as 1,3,5-tri (bromo methyl)benzene); U.S. Pat. No. 4,616,069 (tin compound and organic amino or amine compound); and U.S. 2005/0124740.

The application of "coupling agents," as reactant to living polymers, more often than not, leads to the formation of polymer blends comprising one fraction of linear or uncoupled polymers and one or more fractions comprising more than two polymer arms at the coupling point. For example, silicon tetrahalide can be mentioned as one typical representative of silicone halide based coupling agents. The application of silicon tetrahalide in a less than one to one halide to living polymer chain ratio usually leads to the formation of polymer blend fractions comprising branched three arm and/or four arm polymers of relatively high molecular weight, and to a polymer blend fraction of non-branched polymers of comparably low molecular weight. The function of the branched polymer blend fraction is to reduce the elastomeric polymer hysteresis. The function of the relative low molecular weight non-branched polymer fraction is to optimize polymer processing properties. End-functionalization of the non-branched polymer blend fraction can be performed in another process step, further decreasing the polymer hysteresis attributed to polymer chain end to polymer interactions, or to polymer chain end to filler interaction. Both polymer to polymer, and/or polymer to filler interactions, as observed in the case of the linear chain-end modified polymer fraction, do not occur, or do not occur to the same extent, as in case of the branched polymer blend fraction. Therefore, it is desirable to incorporate one or more group(s) into the coupling agent, which are reactive with the filler particle surface, for example with groups located on a silica surface or a carbon black surface. Generally, it is desirable to incorporate one or more group(s), which are reactive with the filler particle surface, into all polymer molecules present in an elastomeric polymer blend or present in an elastomeric polymer composition.

"Synthesis of end-functionalized polymer by means of living anionic polymerization" Journal of Macromolecular Chemistry and Physics 197 (1996), 3135-3148, describes the synthesis of polystyrene-containing and polyisoprene-containing living polymers with hydroxy (—OH) and mercapto (—SH) functional end caps, obtained by reacting the living polymer with haloalkanes containing silyl ether and silyl thioether functions. The tertiary-butyldimethylsilyl (TB-DMS) group is preferred as protecting group for the —OH and —SH functions in the termination reactions, because the corresponding silyl ethers and thioethers are found to be both, stable and compatible with anionic living polymers.

International Publication No. WO2007/047943 describes the use of a silane-sulfide modifier represented by the formula $(RO)_x(R)_y Si-R'-S-SiR_3$ wherein x is the number one, two or three, y is the number zero, one or two, the sum of x and y is three, R is alkyl and R' is aryl, alkylaryl or alkyl, to produce a chain end modified elastomeric polymer used as component in a vulcanized elastomeric polymer composition or in a tire tread.

More specifically, according to WO2007/047943, a silane-sulfide compound is reacted with anionically-initiated, living polymers to produce chain end modified polymers, which are subsequently blended with fillers, vulcanizing agents, accelerators or oil extenders, to produce a vulcanized elastomeric polymer composition having low hysteresis loss. To further control polymer molecular weight and polymer properties, a coupling agent (or linking agent) can be used according to WO 2007/047943, as optional component, in the process of the preparation of elastomeric polymers. The modifier is than added before, after, or during, the addition of a coupling agent, and preferably, a modification reaction is completed after the addition of the coupling agent. In some embodiments, more than a third of the polymer chain ends are reacted with a coupling agent prior to addition of the modifier.

There is a need for modification methods and resulting modified polymers that can be used to further reduce hysteresis loss. These needs have been met by the following invention.

SUMMARY OF THE INVENTION

The invention provides a first elastomeric polymer composition comprising the reaction product of at least the following:

i) a living anionic elastomeric polymer;
ii) a silane modifier compound represented by the Formula 1 or Formula 2:

Formula 1

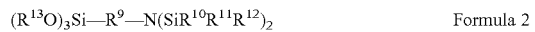

Formula 2 wherein:

Si is silicon; S is sulfur; O is oxygen; N is nitrogen;

$R^4$ and $R^9$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl to may be linear or branched, and saturated or unsaturated;

$R^1, R^3, R^{10}, R^{11}, R^{12}$ and $R^{13}$ are the same or different, and are each, independently, selected from hydrogen (H), a $(C_1-C_{16})$ alkyl, a $(C_6-C_{16})$ aryl, a $(C_7-C_{16})$ aralkyl or a $(C_3-C_{30})$ tri(hydrocarbyl)silyl, and wherein the hydrocarbyl groups are each, independently, selected from a $(C_1-C_{16})$ alkyl, a $(C_6-C_{16})$ aryl, or a $(C_7-C_{16})$ aralkyl;

iii) a modifier compound represented by one of the following Formulas 3 to 6:

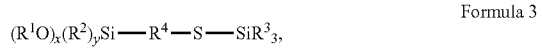

Formula 3

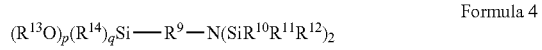

Formula 4

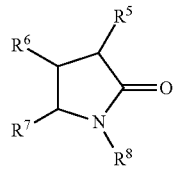

Formula 5

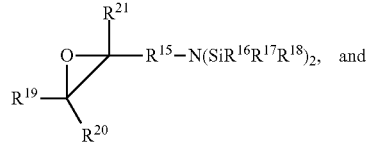

Formula 6 wherein:

Si is silicon; S is sulfur; O is oxygen; N is nitrogen, x and p are an integer selected from 1, and 2;

y and q are an integer selected from 1, and 2;

x+y=3; p+q=3;

$R^4, R^9$ and $R^{15}$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl may be linear or branched, and saturated or unsaturated;

$R^1, R^2, R^3, R^5, R^6, R^7, R^8, R^{10}, R^{11}, R^{12}, R^{13}, R^{14}, R^{16}, R^{17}, R^{18}, R^{19}, R^{20}$, and $R^{21}$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri(hydrocarbyl)silyl, and wherein the hydrocarbyl groups are each independently selected from a $(C_1-C_{16})$ alkyl, a $(C_6-C_{16})$ aryl, or a $(C_7-C_{16})$ aralkyl.

The invention also provides a composition comprising at least the following:

i) a living anionic elastomeric polymer;
ii) a silane modifier compound represented by the Formula 1 or Formula 2:

Formula 1

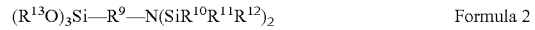

Formula 2 wherein:

Si is silicon; S is sulfur; O is oxygen; N is nitrogen;

$R^4$ and $R^9$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl may be linear or branched, and saturated or unsaturated;

$R^1, R^3, R^{10}, R^{11}, R^{12}$ and $R^{13}$ are the same or different, and are each, independently, selected from hydrogen (H), a $(C_1-C_{16})$ alkyl, a $(C_6-C_{16})$ an aryl, a $(C_7-C_{16})$ aralkyl or a $(C_3-C_{30})$ tri(hydrocarbyl)silyl, and wherein the hydrocarbyl groups are each, independently, selected from a $(C_1-C_{16})$ alkyl, a $(C_6-C_{16})$ an aryl, or a $(C_7-C_{16})$ aralkyl;

iii) a modifier compound represented by one of the following Formulas 3 to 6:

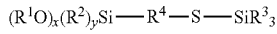  Formula 3

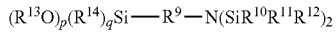  Formula 4

Formula 5

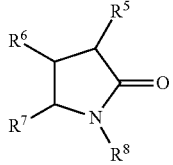

Formula 6

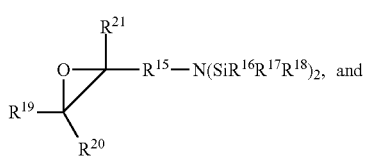

wherein:
Si is silicon; S is sulfur; O is oxygen; N is nitrogen,
x and p are an integer selected from 1, and 2;
y and q are an integer selected from 1, and 2;
x+y=3; p+q=3;
$R^4$, $R^9$ and $R^{15}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, an amine, a thioalkyl, or combinations thereof; and wherein each alkyl may be linear or branched, and saturated or unsaturated; and
$R^1, R^2, R^3, R^5, R^6, R^7, R^8, R^{10}, R^{11}, R^{12}, R^{13}, R^{14}, R^{16}, R^{17}, R^{18}, R^{19}, R^{20}$, and $R^{21}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, or a ($C_7$-$C_{16}$) aralkyl.

The invention also provides a method for making a first elastomeric polymer composition, comprising the following:
A) reacting at least the following constituents to form a first modified polymer:
i) a living anionic elastomeric polymer, and
ii) a silane modifier compound represented by the Formula 1 or Formula 2:

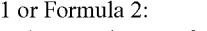  Formula 1

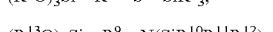  Formula 2 wherein:
Si is silicon; S is sulfur; O is oxygen; N is nitrogen;
$R^4$ and $R^9$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, an amine, a thioalkyl, or combinations thereof; and wherein each alkyl may be linear or branched, and saturated or unsaturated;
$R^1, R^3, R^{10}, R^{11}, R^{12}$ and $R^{13}$ are the same or different, and are each independently, selected from hydrogen (H), a ($C_1$-$C_{16}$) alkyl, a ($C_6$-$C_{16}$) an aryl, a ($C_7$-$C_{16}$) aralkyl or a ($C_3$-$C_{30}$) tri(hydrocarbyl)silyl, and wherein the hydrocarbyl groups are each, independently, selected from a ($C_1$-$C_{16}$) alkyl, a ($C_6$-$C_{16}$) an aryl, or a ($C_7$-$C_{16}$) aralkyl;

B) reacting the first modified polymer with at least the following to form a first elastomeric polymer:
iii) a modifier compound represented by one of the following Formulas 3 to 6:

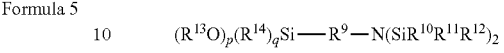  Formula 3

  Formula 4

Formula 5

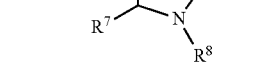

Formula 6

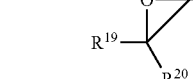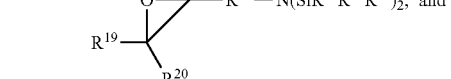

wherein:
Si is silicon; S is sulfur; O is oxygen; N is nitrogen,
x and p are an integer selected from 1, and 2;
y and q are an integer selected from 1, and 2;
X+y=3; p+q=3;
$R^4$, $R^9$ and $R^{15}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, an amine, a thioalkyl, or combinations thereof; and wherein each alkyl may be linear or branched, and saturated or unsaturated;
$R^1, R^2, R^3, R^5, R^6, R^7, R^8, R^{10}, R^{11}, R^{12}, R^{13}, R^{14}, R^{16}, R^{17}, R^{18}, R^{19}, R^{20}$, and $R^{21}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, or a ($C_7$-$C_{16}$) aralkyl.

DETAILED DESCRIPTION OF THE INVENTION

The invention provides for the use of two different types of modifier agents, particularly the use of at least one silane modifier as coupling agent and of at least one different modifier as end-modification agent, to form a first (uncrosslinked) modified elastomeric polymer composition comprising branched modified polymers and linear end-modified polymers.

The term "branched modified polymers" is intended to mean polymers comprising more than one polymer arm bonded to one structure element derived from a modifier compound. In such a case the structure element derived from the modifier compound is located within a polymer molecule, and not at the chain end of the polymer molecule. A living polymer chain is rendered a polymer arm through reaction of the anionic polymer chain end with a modifier compound (modified coupling agent).

The term "linear end-modified polymers" is intended to mean polymers comprising just one polymer arm bonded to one structure element derived from an end-modifier compound. The structure element in the polymer derived from an end-modifier compound is located at a polymer chain end of the polymer molecule.

It is noted, that polymer arms used for the preparation of branched modified polymer macromolecules or polymer arms used for the preparation of linear end-modified polymer macromolecules may already contain polymer chain branches. Such polymer chain branches are formed prior to the modifying coupling reaction and prior to the polymer chain-end modification reaction. For example, such polymer chains are formed in the course of the monomer polymerization process, or after contacting the living polymer chains with Lewis bases, such as used as randomizer component or as accelerator of the polymerization rate.

Each term "branched modified polymers" and "linear end-modified polymers" refers to polymer arms attached to one structure element, derived from a modification agent (modified coupling agent or end-modification agent), and do not exclude the presence of polymer chain branches comprising short or long polymerized segments of monomers.

A sufficient amount of branched and linear polymer fractions, produced by using at least one modifier compound (modified coupling agent) and at least one end-modifier compound, in the course of the modification of living polymer chain ends, provides a first (uncrosslinked) elastomeric polymer composition having an increased degree of functionalized polymer macromolecules. The use of the first, uncrosslinked elastomeric polymer composition in a second composition, further comprising filler particles, will increase the interaction of the modified polymers with the filler particles, as well as with unsaturations in polymer backbones, particularly when the polymer composition is vulcanized to produce a vulcanized or crosslinked elastomeric polymer composition. Polymers having an unsaturated polymer backbone include the modified elastomeric polymers of the invention, or other polymers containing unsaturated carbon-carbon bonds, which are added to the first composition or to the second "filler containing" composition. The distribution of filler particles in the second modified elastomeric polymer composition will be improved, and the hysteresis loss in the corresponding vulcanizate will be decreased.

The inventive modification of all polymer fractions in the first (uncrosslinked) elastomeric polymer composition is especially beneficial for high molecular weight polymers, though no limitation is given to the molecular weight of polymers. In the case of high molecular weight polymers, the proportion by weight of end groups is small, and therefore such end groups have only a small effect on the interactions between filler and polymer, or between different polymer chains. In a preferred embodiment, present invention provides elastomeric polymer compositions having a higher concentration of polymer bound modifier groups for interacting with fillers and/or with polymer chains.

The subject invention includes a first modified uncrosslinked elastomeric polymer composition, comprising linear end-modified polymers and modified branched polymers. The polymer is formed from a composition comprising the reaction product of a living anionic elastomeric polymer, at least one silane modifier represented by Formula 1 and 2, as shown herein, and at least one modifier represented by Formula 3, 4, 5 and 6, as shown herein. The subject invention includes a second modified elastomeric polymer composition comprising the first composition and filler. The subject invention also includes a vulcanized or crosslinked modified elastomeric polymer composition.

The invention further includes methods for making such first and second polymer compositions comprising linear end-modified polymers and modified branched polymers, their use in preparing vulcanized (or cross-linked) elastomeric polymer compositions, and articles made from such compositions such as pneumatic tires, tire treads, belts, footwear and the like.

The subject cross-linked elastomeric polymer compositions exhibit lower Tan δ at 60° C. values, and a good balance of physical properties, including one or more of: abrasion resistance, tensile strength, modulus, heat build up and tear, while compounds comprising the uncrosslinked elastomeric polymers (compounds prior to vulcanization) maintain good processing characteristics, The subject compositions are useful in preparing tire treads having lower rolling resistance, while maintaining good grip and wear properties. The subject compositions are particularly useful in preparing tires including fillers such as carbon black, silica, carbon-silica dual phase filler, and the like.

The invention also provides an article comprising at least one component formed from an inventive composition. In a further embodiment, the article is a tire tread. In another embodiment, the inventive article is an automotive part. In another embodiment, the inventive article is a footwear component. In another embodiment, the inventive article is a belt, a gasket, a seal, or a hose.

As discussed above the invention provides a first elastomeric polymer composition comprising the reaction product of at least the following:

i) a living anionic elastomeric polymer;

ii) a silane modifier compound represented by the Formula 1 or Formula 2:

$(R^1O)_3Si\text{—}R^4\text{—}S\text{—}SiR^3{}_3$,  Formula 1

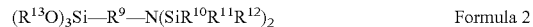
$(R^{13}O)_3Si\text{—}R^9\text{—}N(SiR^{10}R^{11}R^{12})_2$  Formula 2 wherein:

Si is silicon; S is sulfur; O is oxygen; N is nitrogen;

$R^4$ and $R^9$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, an amine, a thioalkyl, or combinations thereof; and wherein each alkyl (contained in $R^4$ or $R^9$) may be linear or branched, and saturated or unsaturated;

$R^1$, $R^3$, $R^{10}$, $R^{11}$, $R^{12}$ and $R^{13}$ are the same or different, and are each, independently, selected from hydrogen (H), a ($C_1$-$C_{16}$) alkyl, a ($C_6$-$C_{16}$) an aryl, a ($C_7$-$C_{16}$) aralkyl or a ($C_3$-$C_{30}$) tri(hydrocarbyl)silyl, and wherein the hydrocarbyl groups are each, independently, selected from a ($C_1$-$C_{16}$) alkyl, a ($C_6$-$C_{16}$) an aryl, or a ($C_7$-$C_{16}$) aralkyl;

iii) a modifier compound represented by one of the following Formulas 3 to 6:

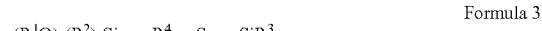
$(R^1O)_x(R^2)_y Si\text{—}R^4\text{—}S\text{—}SiR^3{}_3$,  Formula 3

$(R^{13}O)_p(R^{14})_q Si\text{—}R^9\text{—}N(SiR^{10}R^{11}R^{12})_2$  Formula 4

Formula 5

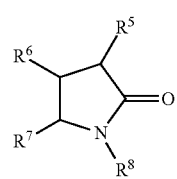

-continued

Formula 6

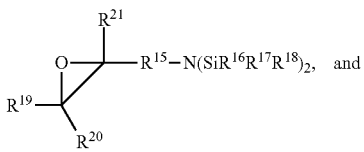

wherein:

Si is silicon; S is sulfur; O is oxygen; N is nitrogen, x and p are an integer selected from 1, and 2;

y and q are an integer selected from 1, and 2;

x+y=3; p+q=3;

$R^4$, $R^9$ and $R^{15}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, an amine, a thioalkyl, or combinations thereof; and wherein each alkyl (contained in $R^4$, $R^9$ or $R^{15}$) may be linear or branched, and saturated or unsaturated;

$R^1$, $R^2$, $R^3$, $R^5$, $R^6$, $R^7$, $R^8$, $R^{10}$, $R^{11}$, $R^{12}$, $R^{13}$, $R^{14}$, $R^{16}$, $R^{17}$, $R^{18}$ $R^{19}$, $R^{20}$, and $R^{21}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, or a ($C_7$-$C_{16}$) aralkyl.

In a preferred embodiment, Component i and Component ii are first reacted to form a first modified polymer, and the first modified polymer is then reacted with Component iii.

In one embodiment, for Formulas 1 and 2, $R^4$ and $R^9$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or thioalkyl; and wherein each alkyl may be linear or branched, and saturated or unsaturated.

In one embodiment, for Formulas 3-6, $R^4$, $R^9$ and $R^{15}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or a thioalkyl; and wherein each alkyl may be iii linear or branched, and saturated or unsaturated.

In one embodiment, the silane modifier (Component ii) is the compound of Formula 1. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the silane modifier (Component ii) is the compound of Formula 2. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, for each formula 1-6, $R^1$ and $R^{13}$ are each independently a C1-C4 alkyl, and preferably methyl, ethyl, a propyl isomer, or a butyl isomer.

In one embodiment, for each formula 1-6, $R^2$, $R^3$, $R^{10}$, $R^{11}$, $R^{12}$, $R^{14}$, $R^{16}$, $R^{17}$, $R^{18}$, are each individually selected from the group consisting of a linear C1-$C_6$ alkyl, a cyclic C6-C12 alkyl, and a C6-C15 aryl.

In one embodiment, for each formula 1-6, $R^4$, $R^9$, $R^{15}$, are each individually selected from the group consisting of a linear C1-C10 alkyl (divalent), a cyclic C6-C12 alkyl (divalent), a C6-C15 aryl (divalent), and a C7-C12 alkylaryl (divalent).

In one embodiment, for each formula 1-6, $R^5$, $R^6$, $R^7$, $R^8$, $R^{19}$, $R^{20}$, $R^{21}$ are each individually selected from the group consisting of an aliphatic C1-C10 alkyl, a linear C1-C15 alkyl, a C6-C15 aryl, and a C7-C15 alkylaryl.

In one embodiment, the elastomeric polymer is selected from the group consisting of styrene-butadiene copolymers, polybutadiene, butadiene-isoprene copolymers, polyisoprene and butadiene-styrene-isoprene terpolymers.

The first elastomeric polymer composition may comprise a combination of two or more embodiments as described herein.

The invention also provides a composition comprising the first elastomeric polymer composition.

In one embodiment, the composition comprises a filler.

In one embodiment, the composition comprises a vulcanization agent.

In one embodiment, the composition comprises an oil.

In one embodiment, the composition comprises at least one polymer selected from the group consisting of styrene-butadiene copolymers, polybutadiene, butadiene-isoprene copolymers, polyisoprene, butadiene-styrene-isoprene terpolymers, and combinations thereof.

An inventive composition may comprise a combination of two or more embodiments as described herein.

The invention also provides an article comprising at least one component formed from an inventive composition. In one embodiment, the article is a tire.

An inventive article may comprise a combination of two or more embodiments as described herein.

The invention also provides a second elastomeric polymer composition comprising the reaction product of the following:

1) a filler;

2) the first elastomeric polymer composition.

In a preferred embodiment, Component i and Component ii are first reacted to form a first modified polymer, and the first modified polymer is then reacted with Component iii to form the first elastomeric polymer composition.

In one embodiment, the silane modifier (Component ii) is the compound of Formula 1. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the silane modifier (Component ii) is the compound of Formula 2. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the ix) compound of Formula 6.

In one embodiment, the elastomeric polymer is selected from the group consisting of styrene-butadiene copolymers, polybutadiene, butadiene-isoprene copolymers, polyisoprene and butadiene-styrene-isoprene terpolymers.

The second elastomeric polymer composition may comprise a combination of two or more embodiments as described herein.

The invention also provides a composition comprising the second elastomeric polymer composition.

In one embodiment, the composition comprises a filler.

In one embodiment, the composition comprises a vulcanization agent.

In one embodiment, the composition comprises an oil.

In one embodiment, the composition comprises at least one polymer selected from the group consisting of styrene-butadiene copolymers, polybutadiene, butadiene-isoprene copolymers, polyisoprene, butadiene-styrene-isoprene terpolymers, and combinations thereof.

An inventive composition may comprise a combination of two or more embodiments as described herein.

The invention also provides an article comprising at least one component formed from an inventive composition. In one embodiment, the article is a tire.

An inventive article may comprise a combination of two or more embodiments as described herein.

The invention also provides a vulcanized elastomeric polymer composition comprising the reaction product of the following:

1) a filler;
2) a vulcanization agent; and
3) the first elastomeric polymer composition.

In a preferred embodiment, Component i and Component ii are first reacted to form a first modified polymer, and the first modified polymer is then reacted with Component iii to form the first elastomeric composition.

In one embodiment, the silane modifier (Component ii) is the compound of Formula 1. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the silane modifier (Component ii) is the compound of Formula 2. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the elastomeric polymer is selected from the group consisting of styrene-butadiene copolymers, polybutadiene, butadiene-isoprene copolymers, polyisoprene, and butadiene-styrene-isoprene terpolymers.

The vulcanized elastomeric polymer composition may comprise a combination of two or more embodiments as described herein.

The invention also provides an article comprising at least one component formed from the vulcanized elastomeric polymer composition. In one embodiment, the article is a tire.

An inventive article may comprise a combination of two or more embodiments as described herein.

The invention also provides a composition comprising at least the following:
i) a living anionic elastomeric polymer;
ii) a silane modifier compound represented by the Formula 1 or Formula 2:

$(R^1O)_3Si-R^4-S-SiR^3{}_3$,  Formula 1

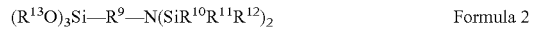

$(R^{13}O)_3Si-R^9-N(SiR^{10}R^{11}R^{12})_2$  Formula 2 wherein:
Si is silicon; S is sulfur; O is oxygen; N is nitrogen;
$R^4$ and $R^9$ are the same or different, and each is independently a group to selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl (contained in $R^4$ or $R^9$) may be linear or branched, and saturated or unsaturated;
$R^1, R^3, R^{10}, R^{11}, R^{12}$ and $R^{13}$ are the same or different, and are each, independently, selected from hydrogen (H), a $(C_1-C_{16})$ alkyl, a $(C_6-C_{16})$ an aryl, a $(C_7-C_{16})$ aralkyl or a $(C_3-C_{30})$ tri(hydrocarbyl)silyl, and wherein the hydrocarbyl groups are each, independently, selected from a $(C_1-C_{16})$ alkyl, a $(C_6-C_{16})$ an aryl, or a $(C_7-C_{16})$ aralkyl; and iii) a modifier compound represented by one of the following Formulas 3 to 6:

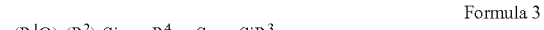

$(R^1O)_x(R^2)_ySi-R^4-S-SiR^3{}_3$,  Formula 3

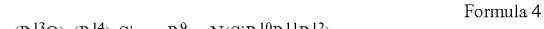

$(R^{13}O)_p(R^{14})_qSi-R^9-N(SiR^{10}R^{11}R^{12})_2$  Formula 4

Formula 5

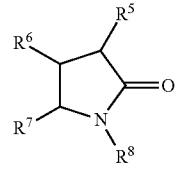

Formula 6

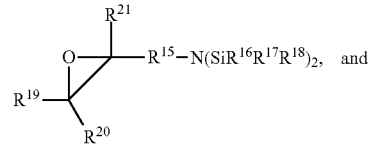

$R^{15}-N(SiR^{16}R^{17}R^{18})_2$,  and wherein:
Si is silicon; S is sulfur; O is oxygen; N is nitrogen,
x and p are an integer selected from 1, and 2;
y and q are an integer selected from 1, and 2;
x+y=3; p+q=3;
$R^4, R^9$ and $R^{15}$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl (contained in $R^4, R^9$ or $R^{15}$) may be linear or branched, and saturated or unsaturated;
$R^1, R^2, R^3, R^5, R^6, R^7, R^8, R^{10}, R^{11}, R^{12}, R^{13}, R^{14}, R^{16}, R^{17}, R^{18}, R^{19}, R^{20}$, and $R^{21}$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri(hydrocarbyl)silyl, and wherein the hydrocarbyl groups are each independently selected from a $(C_1-C_{16})$ alkyl, a $(C_6-C_{16})$ aryl, or a $(C_7-C_{16})$ aralkyl.

In one embodiment, for Formulas 1 and 2, $R^4$ and $R^9$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a $(C_1-C_4)$ alkyl, a $(C_1-C_4)$ alkoxy, a $(C_7-C_{16})$ aryl, a $(C_7-C_{16})$ aralkyl, an amine, or thioalkyl; and wherein each alkyl may be linear or branched, and saturated or unsaturated.

In one embodiment, for Formulas 3-6, $R^4$, $R^9$ and $R^{15}$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a $(C_1-C_4)$ alkyl, a $(C_1-C_4)$ alkoxy, a $(C_7-C_{16})$ aryl, a $(C_7-C_{16})$ aralkyl, an amine, or a thioalkyl; and wherein each alkyl may be linear or branched, and saturated or unsaturated.

In one embodiment, the silane modifier (Component ii) is the compound of Formula 1. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the silane modifier (Component ii) is the compound of Formula 2. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the elastomeric polymer is selected from the group consisting of styrene-butadiene copolymers, polybutadiene, butadiene-isoprene copolymers, polyisoprene, and butadiene-styrene-isoprene terpolymers.

In one embodiment, the composition further comprises a filler.

In one embodiment, the composition further comprises a vulcanization agent.

In one embodiment, the composition further comprises an oil.

In one embodiment, the composition further comprises at least one polymer selected from the group consisting of styrene-butadiene copolymers, polybutadiene, butadiene-isoprene copolymers, polyisoprene, butadiene-styrene-isoprene terpolymers, and combinations thereof.

An inventive composition may comprise a combination of two or more embodiments as described herein.

The invention also provides an article comprising at least one component formed from an inventive composition. In one embodiment, the article is a tire.

An inventive article may comprise a combination of two or more embodiments as described herein.

The invention also provides a method for making a first elastomeric polymer composition, comprising the following:
A) reacting at least the following constituents to form a first modified polymer:
    i) a living anionic elastomeric polymer, and
    ii) a silane modifier compound represented by the Formula 1 or Formula 2:

$$(R^1O)_3Si{-}R^4{-}S{-}SiR^3{}_3, \quad \text{Formula 1}$$

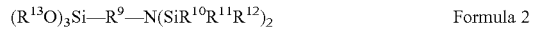
$$(R^{13}O)_3Si{-}R^9{-}N(SiR^{10}R^{11}R^{12})_2 \quad \text{Formula 2}$$

wherein:
Si is silicon; S is sulfur; O is oxygen; N is nitrogen;
$R^4$ and $R^9$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl (contained in $R^4$ or $R^9$) may be linear or branched, and saturated or unsaturated;

$R^1$, $R^3$, $R^{10}$, $R^{11}$, $R^{12}$ and $R^{13}$ are the same or different, and are each, independently, selected from hydrogen (H), a $(C_1-C_{16})$ alkyl, a $(C_6-C_{16})$ an aryl, a $(C_7-C_{16})$ aralkyl or a $(C_3-C_{30})$ tri(hydrocarbyl)silyl, and wherein the hydrocarbyl groups are each, independently, selected from a $(C_1-C_{16})$ alkyl, a $(C_6-C_{16})$ an aryl, or a $(C_7-C_{16})$ aralkyl;

B) reacting the first modified polymer with at least the following constituent to form the first elastomeric polymer:
    iii) a modifier compound represented by one of the following Formulas 3 to 6:

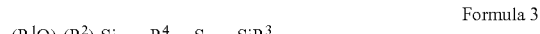
$$(R^1O)_x(R^2)_y Si{-}R^4{-}S{-}SiR^3{}_3, \quad \text{Formula 3}$$

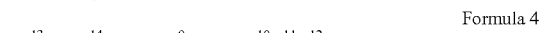
$$(R^{13}O)_p(R^{14})_q Si{-}R^9{-}N(SiR^{10}R^{11}R^{12})_2 \quad \text{Formula 4}$$

Formula 5

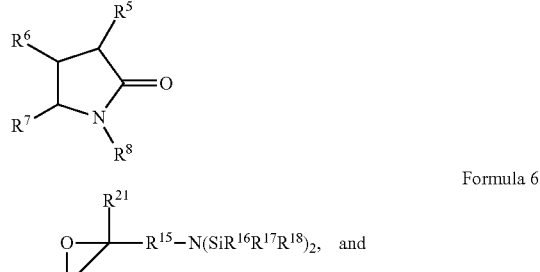
Formula 6 wherein:
Si is silicon; S is sulfur; O is oxygen; N is nitrogen,
x and p are an integer selected from 1, and 2;
y and q are an integer selected from 1, and 2;
x+y=3; p+q=3;
$R^4$, $R^9$ and $R^{15}$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl (contained in $R^4$, $R^9$ or $R^{15}$) may be linear or branched, and saturated or unsaturated;

$R^1$, $R^2$, $R^3$, $R^5$, $R^6$, $R^7$, $R^8$, $R^{10}$, $R^{11}$, $R^{12}$, $R^{13}$, $R^{14}$, $R^{16}$, $R^{17}$, $R^{18}$, $R^{19}$, $R^{20}$, and $R^{21}$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri(hydrocarbyl)silyl, and wherein the hydrocarbyl groups are each independently selected from a $(C_1-C_{16})$ alkyl, a $(C_6-C_{16})$ aryl, or a $(C_7-C_{16})$ aralkyl.

In one embodiment, for Formulas 1 and 2, $R^4$ and $R^9$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or thioalkyl; and wherein each alkyl may be linear or branched, and saturated or unsaturated.

In one embodiment, for Formulas 3-6, $R^4$, $R^9$ and $R^{15}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or a thioalkyl; and wherein each alkyl may be linear or branched, and saturated or unsaturated.

In one embodiment, the silane modifier (Component ii) is the compound of Formula 1. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the silane modifier (Component ii) is the compound of Formula 2. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

The invention also provides a method for making a vulcanized elastomeric polymer composition comprising reacting at least the following constituents:

1) a filler;
2) a vulcanization agent; and
3) the first elastomeric polymer composition.

In a preferred embodiment, Component i and Component ii are first reacted to form a first modified polymer, and the first modified polymer is then reacted with Component iii to form the first elastomeric composition.

In one embodiment, the silane modifier (Component ii) is the compound of Formula 1. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

In one embodiment, the silane modifier (Component ii) is the compound of Formula 2. In a further embodiment, the modifier compound (Component iii) is the compound of Formula 3. In another embodiment, the modifier compound is the compound of Formula 4. In another embodiment, the modifier compound is the compound of Formula 5. In another embodiment, the modifier compound is the compound of Formula 6.

Elastomeric polymers can be divided into two groups "cross-linked elastomeric polymers" and "uncrosslinked elastomeric polymers".

The term "crosslinked elastomeric polymers" is intended to mean elastomers or rubbers, representing at least partially cross-linked polymers having properties as known for, or similar to, vulcanized natural rubber (cis-1,4 polyisoprene); for example, stretch under tension and retract relatively quickly to approximately the original length when released. The polymer cross-links are for example formed through vulcanization using sulfur or through application of radical forming compounds, such as azo- or peroxide-containing compounds.

The term "uncrosslinked elastomeric polymers" is intended to mean the uncrosslinked precursor polymers of the above described crosslinked elastomeric polymers. It is noted that "uncrosslinked elastomeric polymers" comprise a predominant amount of polymer in uncrosslinked form, but may also comprise minor amounts of polymer in crosslinked form. For example, there may be present in an uncrosslinked elastomeric polymer, a crosslinked polymer present in an amount less than 10 weight percent, preferably less than 5 weight percent, and more preferably less than 2 weight percent, based on the total weight of the elastomeric polymer.

The term "elastomeric polymers," if used as such, includes both above defined groups, "cross-linked-" and "uncrosslinked elastomeric polymers."

The use of ionic initiators, such as lithium initiators, to polymerize conjugated diene, triene, and monovinyl aliphatic and aromatic monomers, and other monomers, is well known (anionic solution polymerization). These polymerizations proceed according to anionic polymerization mechanisms, wherein the reaction of monomers is by nucleophilic initiation to form and propagate a polymeric structure. In these polymerizations, the active center is typically a carbon ion with a partial or total negative charge. Throughout the polymerization, the polymer structure is ionic or "living." Thus, the polymer structure has at least one reactive or "living" end. This is the context of the term "living," as used herein, to describe those uncrosslinked elastomeric polymers prepared by an anionic solution polymerization technology. Thus, a living anionic elastomeric polymer is prepared by an anionic polymerization, as discussed herein.

Monomers useful in preparing the subject uncrosslinked elastomeric polymers include conjugated olefins and olefins chosen from the group comprising α-olefins, internal olefins, cyclic olefins, polar olefins and nonconjugated diolefins. Suitable conjugated unsaturated monomers are preferably conjugated dienes, such as 1,3-butadiene, 2-alkyl-1,3-butadiene, preferably, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene. Preferred olefins are $C_{2-20}$ α-olefins, including, but not limited to, long chain macromolecular α-olefins, more especially an aromatic vinyl compound. Preferred aromatic vinyl compounds are styrene, including $C_{1-4}$ alkyl substituted styrene, such as 2-methylstyrene, 3-methylstyrene, 4-methylstyrene, 2,4-dimethylstyrene, 2,4,6-trimethylstyrene, α-methylstyrene and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, and mixtures thereof. Suitable polar olefins included acrylonitrile, methacrylates, methylmethacrylate. Suitable nonconjugated olefins include: $C_{4-20}$ diolefins, especially norbornadiene, ethylidenenorbornene, 1,4-hexadiene, 1,5-hexadiene, 1,7-octadiene, 4-vinylcyclohexene, divinylbenzene including 1,2-divinylbenzene, 1,3-divinylbenzene and 1,4-divinylbenzene and mixtures thereof. Preferred conjugated dienes include: butadiene, isoprene and cyclopentadiene, and preferred aromatic α-olefins include: styrene and 4-methylstyrene.

Examples of applicable uncrosslinked elastomeric polymers include homopolymers of conjugated dienes, especially butadiene or isoprene, and random or block co- and terpolymers of at least one conjugated diene, especially butadiene or isoprene, with at least one conjugated diene or with at least one aromatic α-olefin and especially styrene and 4-methylstyrene, aromatic diolefin, especially divinylbenzene. Especially preferred is the random copolymerization, optionally terpolymerization, of at least one conjugated diene with at least one aromatic α-olefin, and optionally at least one aromatic diolefin or aliphatic α-olefin, and especially butadiene or isoprene with styrene, 4-methylstyrene and/or divinylbenzene. Additionally, especially preferred is the random copolymerization of butadiene with isoprene.

Examples of applicable elastomeric polymers include the following:
BR—polybutadiene,
ABR—butadiene/C1-C4-alkyl acrylate copolymers,
CR—polychloroprene,
IR—polyisoprene,
SBR—styrene/butadiene copolymers with styrene contents of 1 to 60, preferably 20 to 50 weight percent,
IIR—isobutylene/isoprene copolymers,
IBR—isoprene/butadiene copolymers,
NBR—butadiene/acrylonitrile copolymers with acrylonitrile contents of 5 to 60 weight percent, preferably 20 to 50 weight percent,
HNBR—partially hydrogenated or fully hydrogenated NBR rubber,
EPDM—ethylene/propylene/diene copolymers and mixtures of theses rubbers.

The acronym "EPDM" represents a ethylene/propylene/diene copolymer.

In one embodiment, elastomeric polymer is a polybutadiene.

In another embodiment, the elastomeric polymer is a butadiene/C1-C4-alkyl acrylate copolymer.

In another embodiment, the elastomeric polymer is a butadiene/styrene copolymer.

In another embodiment, the elastomeric polymer is a butadiene/isoprene copolymer.

In another embodiment, the elastomeric polymer is a polychloroprene.

In another embodiment, the elastomeric polymer is a polyisoprene, including synthetic polyisoprene and natural rubber.

In another embodiment, the elastomeric polymer is a polystyrene.

In another embodiment, the elastomeric polymer is a styrene/butadiene copolymer with a styrene unit content from 1 to 60 weight percent, preferably from 15 to 45 weight percent, based on the total weight of the copolymer.

In another embodiment, the elastomeric polymer is a butadiene/isoprene copolymer with an isoprene unit content from 0.1 to 70 weight percent, preferably from 5 to 50 weight percent, based on the total weight of the copolymer.

In another embodiment, the elastomeric polymer is an isobutylene/isoprene copolymer.

In another embodiment, the elastomeric polymer is a butadiene/acrylonitrile copolymers with an acrylonitrile unit content from 0.1 to 50 weight percent, preferably from 0.5 to 30 weight percent, based on the total weight of the copolymer.

In another embodiment, the elastomeric polymer is a butadiene/acrylmethacrylate copolymers with an acrylmethacrylate unit content from 0.1 to 50 weight percent, preferably from 0.5 to 30 weight percent, based on the total weight of the copolymer.

In another embodiment, the elastomeric polymer is a partially hydrogenated butadiene.

In another embodiment, the elastomeric polymer is a partially hydrogenated styrene-butadiene copolymer.

For producing vehicle tires, natural rubber, emulsion SBR and solution SBR rubbers with a glass transition temperature above −50° C., polybutadiene rubber with a high cis 1,4 content (>90%), which has been prepared using catalysts based on nickel, cobalt, titanium, gadolinium or neodymium, and polybutadiene rubber with a vinyl content of 0 to 75%, and their mixtures, are of particular interest.

For producing vehicle tires furthermore, polybutadiene rubber with a high trans 1,4 content (>75%), or SBR preferably containing between 5 and 40 wt % styrene and a high trans 1,4-polybutadiene content (>75%) of the polybutadiene fraction of the copolymer, and which each type of polymer (SBR or BR) has been prepared with one or more initiator compounds comprising earth alkaline metal compounds, such as described for example in U.S. Pat. Nos. 6,693,160; 6,627,715; 6,489,415; 6,103,842; 5,753,579; 5,086,136 and 3,629,213, incorporated herein as reference, or by using catalysts based on cobalt, such as described for example in U.S. Pat. Nos. 6,310,152; 5,834,573; 5,753,761; 5,448,002 and 5,089,574, and U.S. Publication No. 20030065114, or by using catalysts based on vanadium, such as described for example in European Patent Application No. 1367069; Japanese Patent Application No. 11301794 and U.S. Pat. No. 3,951,936, or by using catalysts based on neodymium, such as described, for example, in European Patent Application Nos. EP0964008 and EP0924214 and in U.S. Pat. Nos. 6,184, 168; 6,018,007; 4,931,376; 5,134,199 and 4,689,368, are of particular interest.

For producing high impact polystyrene (HIPS) and for producing butadiene modified acrylonitrile-styrene copolymer (ABS) furthermore, polybutadiene rubber with a cis-1,4 content between 70 and 97 weight percent and a 1,2-polybutadiene content between 5 and 25 weight percent have been prepared by using catalysts based on chromium and vanadium. Examples are described, for example, in European Patent Application Nos. EP0778291 and EP0841375 and in U.S. Pat. No. 5,981,667.

For producing high impact polystyrene (HIPS) and for producing butadiene modified acrylonitrile-styrene copolymer (ABS), furthermore polybutadiene rubber with a cis-1, 4-polybutadiene content between 90 and 99 weight percent have been prepared by using catalysts based on nickel, cobalt, titanium and neodymium. For producing high impact polystyrene (HIPS) and for producing butadiene modified acrylonitrile-styrene copolymer (ABS), furthermore polybutadiene rubber with a 1,2 content between 10 and 60 weight percent have been prepared by using alkyllithium compounds.

The acronym "HIPS" represents a high impact polystyrene being a polybutadiene or butadiene-styrene copolymer modified polystyrene. The acronym "ABS" represents a polybutadiene or butadiene-styrene copolymer modified acrylnitrile/styrene copolymer.

In general, the polymerization of the diene monomer(s), or copolymerization of the diene monomer(s) with the α-olefin monomer(s), may be accomplished at conditions well known in the art for anionic living type polymerization reactions, for metal complex catalyst based polymerization reactions, or for radical emulsion polymerization reactions. For such polymerizations, typical temperatures are from −50 to 250° C., preferably from 0 to 120° C. The reaction temperature may be the same as the polymerization initiation temperature. The polymerization can be effected at atmospheric pressure, at sub-atmospheric pressure, or at elevated pressures of up to, or even higher than, 500 MPa, continuously or discontinuously. Preferably, the polymerization is performed at pressures from 0.01 and 500 MPa, more preferably from 0.01 and 10 MPa, and most preferably from 0.1 and 2 MPa. Higher pressures can be applied. In such a high-pressure process, the initiator according to the present invention, can also be used with good results. Solution polymerizations normally take place at lower pressures, preferably below 10 MPa. The polymerization can be carried out in the gas phase, as well as in a liquid reaction medium. The polymerization is generally conducted under batch, continuous or semi-continuous polymerization conditions. The polymerization process can be conducted as a gas phase polymerization (e.g. in a fluidized bed or stirred bed reactor), as a solution polymerization, wherein the polymer formed is substantially soluble in the reaction mixture, or a suspension/slurry polymerization, wherein the polymer formed is substantially insoluble in the reaction medium, or as a so-called bulk polymerization process, in which an excess of monomer to be polymerized, is used as the reaction medium.

Polymerization of the aforementioned monomers is, in case of anionic living type polymerization reactions, typically initiated with an anionic initiator, such as, but not limited to, an organo metal compound having at least one lithium, sodium or potassium atom, and where the organo metal compounds contain from 1 to about 20 carbon atoms. Preferably the organo metal compound has at least one lithium atom, such as ethyl lithium, propyl lithium, n-butyl lithium, sec-butyl lithium, tert-butyl lithium, phenyl lithium, hexyl lithium, 1,4-dilithio-n-butane, 1,3-di(2-lithio-2-hexyl)benzene, and preferably n-butyl lithium and sec-butyl lithium. These organo lithium initiators may be used alone or in combination as a mixture of two or more different kinds. The amount of organo lithium initiator used, varies, based upon the monomers being polymerized and on the target molecular weight of the produced polymer; however, the amount is typically from 0.05 to 5 mmol, preferably from 0.2 to 3 mmol per 100 grams of monomer.

Polar coordinator compounds may be optionally added to the polymerization mixture to adjust the microstructure (the content of vinyl bond) of the conjugated diolefin portion of diolefin-type homo-, co- or terpolymer, or to adjust the composition distribution of the aromatic vinyl compound in the conjugated diene monomer containing co- or terpolymer, and thus for example to serve as randomizer component. Polar coordinator compounds are, for example, but not limited to, ether compounds, such as diethyl ether, di-n-butyl ether, ethylene glycol diethyl ether, ethylene glycol dibutylether, diethylene glycol dimethyl ether, propylene glycol dimethyl ether, propylene glycol diethyl ether, propylene glycol dibutylether, alkyltetrahydroforylethers, such as, methyltetrahydrofurylether, ethyltetrahydrofurylether, propyltetrahydrofurylether, butyltetrahydrofurylether, hexyltetrahydrofurylether, octyltetrahydrofurylether, tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene, and dimethoxyethane, and/or tertiary amine compounds, such as butyl ether of triethylamine, pyridine, N,N,N',N'-tetramethyl ethylenediamine, dipiperidinoethane, methyl ether of N,N-diethylethanolamine, ethyl ether of N,N-diethylethanolamine, and N,N-diethylethanolamine The polar coordinator compound will typically be added at a molar ratio of the polar coordinator compound to the lithium initiator within the range from 0.012:1 to 10:1, but typically from 0.1:1 to 8:1, preferably from 0.25:1 to about 6:1, and more preferably from 0.5:1 to 4:1.

The polymerization can optionally be conducted utilizing an oligomeric oxolanyl alkane as a polar coordinator compound. Examples of such compounds are provided in U.S. Pat. Nos. 6,790,921 and 6,664,328.

The polymerization can optionally include accelerators to increase the reactivity of the initiator, to randomly arrange aromatic vinyl compounds introduced in the polymer, or to provide a single chain of aromatic vinyl compounds, and thus influencing the composition distribution of the aromatic vinyl compounds in a conjugated diene containing modified co- or terpolymer of the invention. Examples of applicable accelerators include sodium alkoxides or sodium phenoxides and potassium alkoxides or potassium phenoxides, preferably potassium alkoxides or potassium phenoxides, such as, potassium isopropoxide, potassium t-butoxide, potassium t-amyloxide, potassium n-heptaoxide, potassium benzyloxide, potassium phenoxide; potassium salts of carboxylic acids, such as isovalerianic acid, caprylic acid, lauryl acid, palmitic acid, stearic acid, oleic acid, linolenic acid, benzoic acid, phthalic acid, or 2-ethylhexanoic acid; potassium salts of organic sulfonic acids such as dodecyl benzenesulfonic acid, tetradecyl benzenesulfonic acid, hexadecyl benzenesulfonic acid, or octadecyl benze-nesulfonic acid; and potassium salts of organic phosphorous acids, such as diethyl phosphite, diisopropyl phosphite, diphenyl phosphite, dibutyl phosphite, and dilauryl phosphite. These potassium compounds may be added in an amount from 0.005 to 0.5 mole for 1.0 gram atom equivalent of lithium initiator. If less than 0.005 mole is added, a sufficient effect is not typically achieved. On the other hand, if the amount of the potassium compound is more than about 0.5 mole, the productivity and efficiency of chain end modification reaction is significantly reduced.

An alkali metal alkoxide compound may also be added together with the polymerization initiator, to increase the polymerization reactivity. The alkali metal alkoxide compound can be prepared by reacting an alcohol and an organic alkali metal compound. This reaction may be carried out in a hydrocarbon solvent in the presence of monomers, preferably conjugated diolefin monomers and aromatic vinyl compound monomers, prior to the copolymerization of these monomers. Alkali metal alkoxide compound are exemplary represented by metal alkoxides of tetrahydrofurfuryl alcohol, N,N-dimethyl ethanolamine, N,N-diethyl ethanolamine, 1-piperazine ethanolamine, or the like. An organic alkali metal compound, preferably an organolithium compound, can be used as reactant for an alcohol compound to prepare an alkali metal alkoxide. For example, ethyl lithium, propyl lithium, n-butyllithium, sec-butyl lithium, tert-butyl lithium, and hexyl lithium, and mixtures of these can be given. Of these, n-butyl lithium and sec-butyl lithium are preferable. The molar ratio of an alcoholic compound and an organolithium compound should be from 1:0.7 to 1:5.0, preferably from 1:0.8 to 1:2.0, and more preferably from 1:0.9 to 1:1.2. If the molar ratio of an organolithium compound to an alcoholic compound is more than 5.0, the effect on improvement of tensile strength, abrasion resistance, and hysteresis is compromised. On the other hand, a molar ratio of the organolithium compound smaller than 0.8 retards the speed of polymerization and significantly decreases productivity giving rise to low efficiency of the modified coupling reaction as well as the chain-end modification reaction.

For solution based polymerization processes, the polymerization is conducted in a suitable solvent, dispersion agents or diluent. Non-coordinating, inert liquids are preferred, including, but not limited to, straight and branched-chain hydrocarbons such as propane, butane, isobutane, pentane, hexane, heptane, octane, cyclic and alicyclic hydrocarbons, such as cyclohexane, cycloheptane, methylcyclohexane, methylcycloheptane, aromatic and alkyl-substituted aromatic compounds, such as benzene, toluene, and xylene and isomers of the foregoing, and mixtures thereof, as well as pentamethyl heptane or mineral oil fractions such as light or regular petrol, naphtha, kerosene or gas oil. Fluorinated hydrocarbon fluids, such as perfluorinated $C_{4-10}$ alkanes are also suitable. Further, suitable solvents, including liquid olefins, which may act as monomers or comonomers in the polymerization process, including propylene, 1-butene, 1-pentene, cyclopentene, 1-hexene, 3-methyl-1-pentene, 4-methyl-1-pentene, butadiene, isoprene, 1,4-hexadiene, 1,7-octadiene, 1-octene, 1-decene, styrene, divinylbenzene, ethylidenenorbornene, allylbenzene, 2-methylstyrene, 3-methylstyrene, 4-methylstyrene, 4-vinylcyclohexene, and vinylcyclohexane. Mixtures of the solvents are also suitable. Aromatic hydrocarbons, for instance benzene and toluene, can also be used.

To further control polymer molecular weight and polymer properties, a modified coupling agent is employed. The terms "modified coupling agent" is intended to mean the subject compounds described herein with reference to Formulas 1 and 2 below. The terms "modified branched polymer" is intended to mean the reaction product of two or more living elastomeric polymer chains with a subject modified coupling agent.

The silane modifier compound is represented by Formula 1 or Formula 2:

  Formula 1

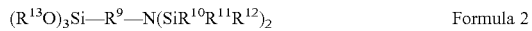  Formula 2 wherein:

Si is silicon; S is sulfur; O is oxygen; N is nitrogen;

$R^4$ and $R^9$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl may be linear or branched, and saturated or unsaturated;

$R^1$, $R^3$, $R^{10}$, $R^{11}$, $R^{12}$, and $R^{13}$ are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

In one embodiment, the hydrocarbyl groups are each independently selected from $(C_1-C_{12})$ alkyl, $(C_6-C_{12})$ aryl, or $(C_7-C_{16})$ aralkyl.

In one embodiment, for Formulas 1 and 2, $R^4$ and $R^9$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a $(C_1-C_4)$ alkyl, a $(C_1-C_4)$ alkoxy, a $(C_7-C_{16})$ aryl, a $(C_7-C_{16})$ aralkyl, an amine, or thioalkyl; and wherein each alkyl may be linear or branched, and saturated or unsaturated.

While not shown in Formula 1 or 2, it will be understood that the subject compounds include their corresponding Lewis base adducts (for example, with solvent molecules tetrahydrofurane, dieethylether, dimethoxyethane coordinated with silicon atoms).

In one embodiment, R1, R3, R10, R11, R12 and R13 are the same or different, and are each independently selected from hydrogen (H), $(C_1-C_{16})$ alkyl, or $(C_1-C_{16})$ trialkylsilyl; and alkyl especially includes Me, Et, Pr (isomers) and Bu (isomers).

In one embodiment, R4 and R9 are the same or different, and are each independently selected from a $(C_1-C_{16})$ divalent alkyl group, or a $(C_1-C_{16})$ divalent aralkyl group; and divalent alkyl groups especially includes divalent Me, Et, Pr and Bu groups.

In one embodiment, R4 and R9 are each, independently, an alkylene. In a further embodiment, the alkylene is selected from —CH2- (methylene), —(CH2)2- (ethylidene), —(CH2)3- (propylidene) and —(CH2)4- (butylidene).

In one embodiment, R4 and R9 are each, independently, a divalent aralkylene. In a further embodiment, the aralkylene is selected from —CH2-C6H4-CH2- (xylidene) or —C6H4-C(CH3)2-C6H4-.

In one embodiment, R1, R3, R10, R11, R12 and R13 are each, independently, an alkyl. In a further embodiment, the alkyl is selected from CH3- (methyl), CH3-CH2- (ethyl), CH3-(CH2)2- (propyl), CH3-(CH2)3 (n-butyl), and CH3-C(CH3)2 (tert.-butyl).

In one embodiment, for each Formula 1-2, $R^1$ and $R^{13}$ are each independently a C1-C4 alkyl, and preferably methyl, ethyl, a propyl isomer, or a butyl isomer.

In one embodiment, for each formula 1-2, $R^3$, $R^{10}$, $R^{11}$, $R^{12}$ are each individually selected from the group consisting of a linear C1-C6 alkyl, a cyclic C6-C12 alkyl, and a C6-C15 aryl.

In one embodiment, for each Formula 1-2, $R^4$, $R^9$ are each individually selected from the group consisting of a linear C1-C10 alkyl (divalent), a cyclic C6-C12 alkyl (divalent), a C6-C15 aryl (divalent), and a C7-C12 alkylaryl (divalent).

Each compound, Formula 1 and Formula 2, may comprise a combination of two or more embodiments as described herein.

The term "alkyl," as used herein, refers to at least one aliphatic group, and may also refer to two or more aliphatic groups. The alkyl group may be linear, branched, cyclic, or a combination thereof, and saturated or unsaturated. The term "alkyl" is understood to include both straight chain aliphatic hydrocarbon groups, (for example, methyl (Me), ethyl (Et), n-propyl (Pr), n-butyl (Bu), n-pentyl, n-hexyl, etc.), branched aliphatic hydrocarbon groups (for example, isopropyl, tertbutyl, etc.) and carbon based non-aromatic rings, aliphatic hydrocarbon groups. Here, "alkyl" refers to saturated linear, branched, cyclic, or combinations thereof, aliphatic hydrocarbon groups, and unsaturated, linear, branched, cyclic, or combinations thereof, aliphatic hydrocarbon groups. It is understood that an alkyl group used as R4, R9 or R15 moiety, as described herein, would be at least divalent.

The term "aryl," as used herein, refers to at least one aromatic ring, and may also refer to two or more aromatic rings. The term "aryl" is understood to include phenyls, biphenyls and other benzenoid compounds, each optionally substituted with alkyl, alkoxy, or other heteroatoms, such as oxygen, nitrogen, sulfur and phosphorous containing moieties. It is understood that an aryl group used as a R4, R9 or R15 moiety, as described herein, would be at least divalent.

The term "alkoxy" is understood to include methoxy (MeO), ethoxy (EtO), propoxy (PrO), butoxy (BuO), isopropoxy, isobutoxy, pentoxy, and the like.

The term "aralkyl," as used herein, refers to at least one aromatic ring, and to also at least one alkyl group. The term "aralkyl" is understood to mean an aryl group bonded to an alkyl. It is understood that an aralkyl group used as R4, R9 and R15, as described herein, would be at least divalent.

The designation of $(C_a-C_b)$, for example $(C_1-C_{100})$, as used herein, is intended to mean a range of carbon atoms from a to b, and includes all individual values and subranges from a to b.

While not shown in Formula 1 or 2, it will be understood that the subject compounds include their corresponding Lewis base adducts (for example, with solvent molecules tetrahydrofuran, diethylether, dimethoxyethane coordinated with silicon atoms).

In one embodiment, the silane modifier compound is represented by the Formula 1.

$$(R^1O)_3Si—R^4—S—SiR^3_3,\qquad\text{Formula 1}$$

wherein:

Si is silicon; S is sulfur; O is oxygen;

$R^4$ a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl may be linear or branched, and saturated or unsaturated;

$R^1$ and $R^3$ are the same or different and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

In one embodiment, $R^4$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a $(C_1-C_4)$ alkyl, a $(C_1-C_4)$ alkoxy, a $(C_7-C_{16})$ aryl, a $(C_7-C_{16})$ aralkyl, an amine, or thioalkyl; and wherein each alkyl may be linear or branched, and saturated or unsaturated.

In one embodiment, the hydrocarbyl groups are each independently selected from $(C_1-C_{12})$ alkyl, $(C_6-C_{12})$ aryl, or $(C_7-C_{16})$ aralkyl.

In one embodiment, R1 and R3 are the same or different, and are each independently selected from hydrogen (H), $(C_1-C_{16})$ alkyl, or $(C_1-C_{16})$ trialkylsilyl; and alkyl especially includes Me, Et, Pr (isomers) and Bu (isomers).

In one embodiment, R4 is a $(C_1-C_{16})$ divalent alkyl group, or a $(C_1-C_{16})$ divalent aralkyl group; and divalent alkyl groups especially include divalent Me, Et, Pr and Bu groups.

In one embodiment, R4 is an alkylene. In a further embodiment, the alkylene is selected from —CH2- (methylene), —(CH2)2- (ethylidene), —(CH2)3- (propylidene) and —(CH2)4- (butylidene).

In one embodiment, R4 is a divalent aralkylene group. In a further embodiment, the aralkylene group is selected from —CH2-C6H4-CH2- (xylidene) or —C6H4-C(CH3)2-C6H4-, In one embodiment, R1, and R3 are each, independently, an alkyl. In a further embodiment, the alkyl is selected from CH3- (methyl), CH3-CH2- (ethyl), CH3-(CH2)2- (propyl), CH3-(CH2)3 (n-butyl), and CH3-C(CH3)2 (tert.-butyl).

In one embodiment, $R^1$ is a C1-C4 alkyl, and preferably methyl, ethyl, propyl isomer, or a butyl isomer.

In one embodiment, $R^3$ is selected from the group consisting of a linear C1-C6 alkyl, a cyclic C6-C12 alkyl, and a C6-C15 aryl.

In one embodiment, $R^4$ is selected from the group consisting of a linear C1-C10 alkyl (divalent), a cyclic C6-C12 alkyl (divalent), a C6-C15 aryl (divalent), and a C7-C12 alkylaryl (divalent).

Formula 1 may comprise a combination of two or more embodiments as described herein.

Useful modifier compounds according to Formula 1 include the following: $(MeO)_3Si—(CH_2)_3—S—SiMe_3$, $(EtO)_3Si—(CH_2)_3—S—SiMe_3$, $(PrO)_3Si—(CH_2)_3—S—SiMe_3$, $(BuO)_3Si—(CH_2)_3—S—SiMe_3$, $(MeO)_3Si—(CH_2)_2—S—SiMe_3$, $(EtO)_3Si—(CH_2)_2—S—SiMe_3$, $(PrO)_3Si—(CH_2)_2—S—SiMe_3$, $(BuO)_3Si—(CH_2)_2—S—SiMe_3$, $(MeO)_3Si—CH_2—S—SiMe_3$, $(EtO)_3Si—CH_2—S—SiMe_3$, $(PrO)_3Si—CH_2—S—SiMe_3$, $(BuO)_3Si—CH_2—S—SiMe_3$, $(MeO)_3Si—CH_2—CMe_2-CH_2—S—SiMe_3$, $(EtO)_3Si—CH_2—CMe_2-CH_2—S—SiMe_3$, $(PrO)_3Si—CH_2—CMe_2-CH_2—S—SiMe_3$, $(BUO)_3Si—CH_2—CMe_2-CH_2—S—SiMe_3$, $(MeO)_3Si—CH_2—C(H)Me-CH_2—S—SiMe_3$, $(EtO)_3Si—CH_2—C(H)Me—CH_2—S—SiMe_3$, $(PrO)_3Si—CH_2—C(H)Me—CH_2—S—SiMe_3$, $(BuO)_3Si—CH_2—C(H)Me—CH_2—S—SiMe_3$, $(MeO)_3Si—(CH_2)_3—S—SiEt_3$, $(EtO)_3Si—(CH_2)_3—S—SiEt_3$, $(PrO)_3Si—(CH_2)_3—S—SiEt_3$, $(BUO)_3Si—(CH_2)_3—S—SiEt_3$, $(MeO)_3Si—(CH_2)_2—S—SiEt_3$, $(EtO)_3Si—(CH_2)_2—S—SiEt_3$, $(PrO)_3Si—(CH_2)_2—S—SiEt_3$, $(BUO)_3Si—(CH_2)_2—S—SiEt_3$, $(MeO)_3Si—CH_2—S—SiEt_3$, $(EtO)_3Si—CH_2—S—SiEt_3$, $(PrO)_3Si—CH_2—S—SiEt_3$, $(BuO)_3Si—CH_2—S—SiEt_3$, $(MeO)_3Si—CH_2—CMe_2-CH_2—S—SiEt_3$, $(EtO)_3Si—CH_2—CMe_2-CH_2—S—SiEt_3$, $(PrO)_3Si—CH_2—CMe_2—CH_2—S—SiEt_3$, $(BuO)_3Si—CH_2—CMe_2-CH_2—S—SiEt_3$, $(MeO)_3Si—CH_2—C(H)Me-CH_2—S—SiEt_3$, $(EtO)_3Si—CH_2—C(H)Me-CH_2—S—SiEt_3$, $(PrO)_3Si—CH_2—C(H)Me-CH_2—S—SiEt_3$, $(BuO)_3Si—CH_2—C(H)Me-CH_2—S—SiEt_3$, In one embodiment, the silane modifier compound is represented by the Formula 2.

$$(R^{13}O)_3Si—R^9—N(SiR^{10}R^{11}R^{12})_2\qquad\text{Formula 2}$$

wherein:

Si is silicon; S is sulfur; O is oxygen; N is nitrogen;

$R^9$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl may be linear or branched, and saturated or unsaturated;

$R^{10}$, $R^{11}$, $R^{12}$, and $R^{13}$ are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

In one embodiment, $R^9$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a $(C_1-C_4)$ alkyl, a $(C_1-C_4)$ alkoxy, a $(C_7-C_{16})$ aryl, a $(C_7-C_{16})$ aralkyl, an amine, or thioalkyl; and wherein each alkyl may be linear or branched, and saturated or unsaturated.

In one embodiment, the hydrocarbyl groups are each independently selected from $(C_1-C_{12})$ alkyl, $(C_6-C_{12})$ aryl, or $(C_7-C_{16})$ aralkyl.

In one embodiment, R9, R10, R11, R12 and R13 are the same or different, and are each independently selected from hydrogen (H), $(C_1-C_{16})$ alkyl, or $(C_1-C_{16})$ trialkylsilyl; and alkyl especially includes Me, Et, Pr and Bu.

In one embodiment, R9 is a $(C_1-C_{16})$ divalent alkyl group, or a $(C_1-C_{16})$ divalent aralkyl group; and divalent alkyl groups especially include divalent Me, Et, Pr and Bu groups.

In one embodiment, R9 is an alkylene. In a further embodiment, the alkylene is selected from —CH2- (methylene), —(CH2)2- (ethylidene), —(CH2)3- (propylidene) and —(CH2)4- (butylidene).

In one embodiment, R9 is a divalent aralkylene group. In a further embodiment, the aralkylene group is selected from —CH2-C6H4-CH2- (xylidene) or —C6H4-C(CH3)2-C6H4-.

In one embodiment, R10, R11, R12 and R13 are each, independently, an alkyl. In a further embodiment, the alkyl is selected from CH3- (methyl), CH3-CH2- (ethyl), CH3-(CH2)2- (propyl), CH3-(CH2)3 and CH3-C(CH3)2 (tert.-butyl).

In one embodiment, $R^{13}$ is a C1-C4 alkyl, and preferably methyl, ethyl, propyl isomer, or a butyl isomer.

In one embodiment, $R^{10}$, $R^{11}$, $R^{12}$, $R^{13}$ are each individually selected from the group consisting of a linear C1-C6 alkyl, a cyclic C6-C12 alkyl, and a C6-C15 aryl.

In one embodiment, $R^9$ is selected from the group consisting of a linear C1-C10 alkyl (divalent), a cyclic C6-C12 alkyl (divalent), a C6-C15 aryl (divalent), and a C7-C12 alkylaryl (divalent).

Formula 2 may comprise a combination of two or more embodiments as described herein.

The modifier compound may be added intermittently (or at regular or irregular intervals) or continuously during the polymerization, but is preferably added at a conversion rate of the polymerization of more than 80 percent, and more preferably at a conversion rate of more than 90 percent.

For example, a modifier compound can be continuously added during the polymerization, in cases where asymmetrical coupling is desired. This continuous addition is normally done in a reaction zone separate from the zone where the bulk of the polymerization is occurring. The modifier compound can be added in a hydrocarbon solution, for example, in cyclohexane, to the polymerization admixture to with suitable mixing for distribution and reaction. The modifier compound will typically be added only after a high degree of conversion has already been attained. For instance, the modifier compound will normally be added only after a monomer conversion of greater than about 80 percent has been realized. It will typically be preferred for the monomer conversion to reach at least about 90 percent before the modifier compound is added. Polymers coupled with modifier compounds according to the invention have a minimum of two arms.

Preferably, a substantial amount of the polymer chain ends are not terminated prior to the reaction with the modifier compound; that is, the living polymer chain ends are present and capable of reacting with the modifier compound in a polymer chain coupling reaction. The modified coupling reaction may be before, after or during the addition of the end-modification agent. Preferably the modifying coupling reaction is completed prior to the addition of the end-modification agent. As result of the modifying coupling reaction 80 percent or less of the living polymer chains are reacted with the modifier compound. Preferably 65 percent or less of the polymer chains are reacted with the modified coupling agent and more preferably 50 percent or less of the polymer chains are reacted with the modifier compound.

In some embodiments, between 10 and 20 percent of the living polymer chain ends, as determined by GPC, are reacted with a modified coupling agent(s) prior to addition of the end-modification agent. In other embodiments, between 20 and 35 percent of the living polymer chain ends are reacted with a modified coupling agent(s) prior to addition of the end-modification agent. In yet other embodiment, between 35 and 50 percent of the living polymer chain ends are reacted with a modified coupling agent(s) prior to addition of the end-modification agent. More than 60 percent, preferably more than 70 percent and more preferably more than 80 percent of the macromolecules formed in the reaction with the modified coupling agent are believed to result in modified branched elastomeric polymers and thus have formed polymer molecules comprising A) one functionality derived from the modified coupling agent and B) two or more polymer arms, each polymer arm derived from one living polymer chain. The modified coupling agent may be directly added into the polymer solution without dilution; however, it may be beneficial to provide addition of the modified coupling agent in solution, such as an inert solvent (for example, cyclohexane). The amount of modified coupling agent added to the polymerization varies depending upon the monomer species, modified coupling agent, end modification agent, reaction conditions, and desired end properties but is generally utilized from about 0.01 to less than one equivalent of modified coupling agent per equivalent of initiator, preferably lithium containing initiator compound, to enable subsequent polymer chain-end modification of the remaining living polymer fraction. For instance, if different types of modified coupling agents are used, between 0.01 and less than 1.5 mol, preferably between 0.01 and 1.0 mol, and more preferably between 0.01 and 0.6 mol, of the modified coupling agent is utilized for every 4.0 moles of living and thus anionic polymer chain ends.

A combination of different modifier compounds, such as, for example, different modifier compounds according to Formula 1, can optionally be used to couple polymer chains. In an another embodiment, a combination of different modifier compounds, such as, for example, a modifier compound according to Formula 1 and a modifier compound according to Formula 2 can optionally be used to couple polymer chains. By using such a combination of modifier compounds, improved properties for tire rubbers, such as lower hysteresis, can be attained. It is particularly desirable to utilize a combination of modifier compounds in tire tread compounds that contain both silica and carbon black.

Most typically, a range of about 0.01 to 3.5 milliequivalents of modifier compound is employed per 100 grams of the elastomeric polymer.

In one embodiment the modified branched elastomeric polymer is represented by Formula P1:

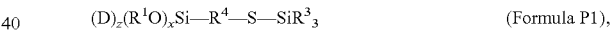

$(D)_z(R^1O)_xSi—R^4—S—SiR^3_3$ (Formula P1), wherein D is an elastomeric polymer, x is an integer selected from 0 and 1; z is an integer selected from 2 and 3, and x+z=3, and all other symbols are as previous defined with respect to Formula 1P. While not shown in Formula P1, it will be understood that the subject compound(s) include their corresponding Lewis base adducts.

The modified coupling agent can be added in a hydrocarbon solution, for example, in cyclohexane, to the polymerization admixture in the reactor with suitable mixing for distribution and reaction.

The modified coupling agent according to Formula 1 of the present invention may be prepared by reacting a sulfur containing compound according to Formula 7:

$(R^1O)_3Si—R^4—S—H$ (Formula 7), wherein the symbols have the same meaning as defined with respect to Formula 1, with a compound according to Formula 8:

$QSiR_3$ (Formula 8), wherein Q is fluorine, chlorine or bromine atom.

The modified coupling agent according to Formula 1 of the present invention may be also prepared by reacting a sulfur containing compound according to Formula 9:

$(R^1O)_3Si—R^4—S-M$ (Formula 9), wherein M is lithium, sodium or potassium and the other symbols have the same meaning as defined with respect to Formula 1, with a compound according to Formula 8:

$$QSiR_3 \qquad \text{(Formula 8)},$$

wherein Q is fluorine, chlorine or bromine atom.

The subject modified coupling agent includes the sulfanylsilane compounds described in U.S. Pat. No. 6,229,036 and in patent application WO 2007047943 (which, to the fullest extent permitted by law, are incorporated herein by reference, including the methods for preparing sulfanylsilane compounds). Of the sulfanylsilane compounds disclosed, those without halogens are preferred.

The modifying coupling reaction may be carried out in a temperature range of 0° C. to 150° C., preferably between 15° C. and 100° C. and even more preferably between 25° C. and 80° C. There is no limitation for the duration of the modification reaction, however with respect to an economical polymerization process, in case of a batch polymerization process, the modification reaction is usually stopped about 5 to 60 minutes after the addition of the modified coupling agent.

To further control polymer properties, an end-modification agent is employed.

The terms "end-modification agent", "chain end modification agent" and "chain end modifier" are intended to mean the subject compounds described herein with reference to Formulas 3, 4, 5 and 6 below. The terms "linear end-modified polymer" is intended to mean the reaction product of primarily one living elastomeric polymer chain with subject end-modification agent.

The subject chain end modifier includes compounds according to Formulas 3, 4, 5 and 6:

$$(R^1O)_x(R^2)_ySi\text{—}R^4\text{—}S\text{—}SiR^3{}_3, \qquad \text{Formula 3}$$

$$(R^{13}O)_p(R^{14})_qSi\text{—}R^9\text{—}N(SiR^{10}R^{11}R^{12})_2 \qquad \text{Formula 4}$$

Formula 5

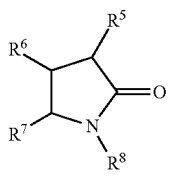

Formula 6

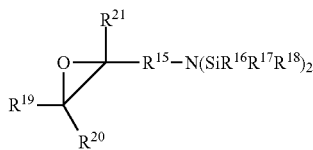

wherein:
Si is silicon; S is sulfur; O is oxygen; N is nitrogen,
x and p are an integer selected from 1, and 2;
y and q are an integer selected from 1, and 2;
x+y=3; p+q=3;
$R^4$, $R^9$ and $R^{10}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, an amine, a thioalkyl, or combinations thereof; and wherein each alkyl may be linear or branched, and saturated or unsaturated;

$R^1$, $R^2$, $R^3$, $R^5$, $R^6$, $R^7$, $R^8$, $R^{10}$, $R^{11}$, $R^{12}$, $R^{13}$, $R^{14}$, $R^{16}$, $R^{17}$, $R^{18}$, $R^{19}$, $R^{20}$, and $R^{21}$ are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl) silyl, and wherein the hydrocarbyl groups are each independently selected from ($C_1$-$C_{16}$)alkyl, ($C_6$-$C_{16}$) aryl, or ($C_7$-$C_{16}$) aralkyl.

In one embodiment, for Formulas 3-6, $R^4$, $R^9$ and $R^{10}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or a thioalkyl; and wherein each alkyl may be linear or branched, and saturated or unsaturated.

In one embodiment, the hydrocarbyl groups are each independently selected from ($C_1$-$C_{12}$) alkyl, ($C_6$-$C_{12}$) aryl, or ($C_7$-$C_{16}$) aralkyl.

In one embodiment, R1, R2, R3, R5, R6, R7, R8, R10, R11, R12, R13, R14, R16, R17, R18, R19, R20 and R21 are the same or different, and are each independently selected from hydrogen (H), ($C_1$-$C_{16}$) alkyl, or ($C_1$-$C_{16}$) trialkylsilyl; and alkyl especially includes Me, Et, Pr and Bu.

In one embodiment, R4, R9, R15, are each independently selected from ($C_1$-$C_{16}$) divalent alkyl group, or a ($C_1$-$C_{16}$) divalent aralkyl group; and divalent alkyl groups especially include divalent Me, Et, Pr and Bu groups.

In one embodiment, R4, R9, R15 are each independently an alkylene. In a further embodiment, the alkylene is selected from —CH2- (methylene), —(CH2)2- (ethylidene), —(CH2)3- (propylidene) and —(CH2)4- (butylidene).

In one embodiment, R4, R9, R15 are each independently a divalent aralkylene group. In a further embodiment, the aralkylene group is selected from —CH2-C6H4-CH2- (xylidene) or —C6H4-C(CH3)2-C6H4-.

In one embodiment, R1, R2, R3, R5, R6, R7, R8, R10, R11, R12, R13, R14, R16, R17, R18, R19, R20 and R21 are each, independently, an alkyl. In a further embodiment, the alkyl is selected from CH3- (methyl), CH3-CH2- (ethyl), CH3-(CH2)2- (propyl), CH3-(CH2)3 (n-butyl) and CH3-C(CH3)2 (tert.-butyl).

In one embodiment, for each formula 3-6, $R^1$ and $R^{13}$ are each independently a C1-C4 alkyl, and preferably methyl, ethyl, propyl isomer, or a butyl isomer.

In one embodiment, for each formula 3-6, $R^2$, $R^3$, $R^{19}$, $R^{11}$, $R^{12}$, $R^{14}$, $R^{16}$, $R^{17}$, $R^{18}$, are each individually selected from the group consisting of a linear $C_1$-$C_6$ alkyl, a cyclic C6-C12 alkyl, and a C6-C15 aryl.

In one embodiment, for each formula 3-6, $R^4$, $R^9$, $R^{15}$, are each individually selected from the group consisting of a linear $C_1$-$C_{10}$ alkyl (divalent), a cyclic C6-C12 alkyl (divalent), a C6-C15 aryl (divalent), and a C7-C12 alkylaryl (divalent).

In one embodiment, for each formula 3-6, $R^5$, $R^6$, $R^7$, $R^8$, $R^{19}$, $R^{20}$, $R^{21}$ are each individually selected from the group consisting of an aliphatic C1-C10 alkyl, a linear C1-C15 alkyl, a C6-C15 aryl, and a C7-C15 alkylaryl.

Each formula, Formula 3-6, may comprise a combination of two or more embodiments as described herein.

In one embodiment, the end-modification agent is the compound of Formula 3:

$$(R^1O)_x(R^2)_ySi\text{—}R^4\text{—}S\text{—}SiR^3{}_3, \qquad \text{Formula 3}$$

wherein:
Si is silicon; S is sulfur; O is oxygen;
x is an integer selected from 1, and 2;
y is an integer selected from 1, and 2;
x+y=3;

$R^4$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl may be linear or branched, and saturated or unsaturated;

$R^1$, $R^2$ and $R^3$ are the same or different, and are each, independently, selected from hydrogen (H), $(C_1-C_{16})$ alkyl, $(C_6-C_{16})$ aryl, $(C_7-C_{16})$ aralkyl or a $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

In one embodiment, $R^4$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a $(C_1-C_4)$ alkyl, a $(C_1-C_4)$ alkoxy, a $(C_7-C_{16})$ aryl, a $(C_7-C_{16})$ aralkyl, an amine, or a thioalkyl; and wherein each alkyl may be linear or branched, and saturated or unsaturated.

In one embodiment, the hydrocarbyl groups are each independently selected from $(C_1-C_{12})$ alkyl, $(C_6-C_{12})$ aryl, or $(C_7-C_{16})$ aralkyl.

In one embodiment, R1, R2 and R3 are the same or different, and are each independently selected from hydrogen (H), $(C_1-C_{16})$ alkyl, or $(C_1-C_{16})$ trialkylsilyl; and alkyl especially includes Me, Et, Pr (isomers) and Bu (isomers).

In one embodiment, R4 is selected from $(C_1-C_{16})$ divalent alkyl group, or a $(C_1-C_{16})$ divalent aralkyl group; and divalent alkyl groups especially include divalent Me, Et, Pr and Bu groups.

In one embodiment, R4 is an alkylene. In a further embodiment, the alkylene is selected from —CH2- (methylene), —(CH2)2- (ethylidene), —(CH2)3- (propylidene) and —(CH2)4- (butylidene).

In one embodiment, R4 is a divalent aralkylene group. In a further embodiment, the aralkylene group is selected from —CH2-C6H4-CH2- (xylidene) or —C6H4-C(CH3)2-C6H4-, In one embodiment, R1, R2 and R3 are each, independently, an alkyl. In a further embodiment, the alkyl is selected from CH3- (methyl), CH3-CH2- (ethyl), CH3-(CH2)2- (propyl), CH3-(CH2)3 (n-butyl) and CH3-C(CH3)2 (tert.-butyl).

In one embodiment, for each formula 3-6, $R^1$ is a C1-C4 alkyl, and preferably methyl, ethyl, propyl isomer, or a butyl isomer.

In one embodiment, for each formula 3-6, $R^2$, $R^3$ are each individually selected from the group consisting of a linear C1-C6 alkyl, a cyclic C6-C12 alkyl, and a C6-C15 aryl.

In one embodiment, for each formula 3-6, $R^4$ is selected from the group consisting of a linear C1-C10 alkyl (divalent), a cyclic C6-C12 alkyl (divalent), a C6-C15 aryl (divalent), and a C7-C12 alkylaryl (divalent).

Formula 3 may comprise a combination of two or more embodiments as described herein.

In one embodiment, the end-modification agent is the compound of Formula 4:

Formula 4 wherein:
Si is silicon; O is oxygen; N is nitrogen,
p is an integer selected from 1, and 2;
q is an integer selected from 1, and 2;
p+q=3;
$R^9$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_7-C_{16})$ aryl, a $(C_7-C_{16})$ aralkyl, an amine, a thioalkyl, or combinations thereof; and wherein each alkyl may be linear or branched, and saturated or unsaturated;

$R^{10}$, $R^{11}$, $R^{12}$, $R^{13}$ and $R^{14}$ are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl)silyl, and wherein the hydrocarbyl groups are each independently selected from $(C_1-C_{16})$ alkyl, $(C_6-C_{16})$ aryl, or $(C_7-C_{16})$ aralkyl.

In one embodiment, $R^9$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with a $(C_1-C_4)$ alkyl, a $(C_1-C_4)$ alkoxy, a $(C_7-C_{16})$ aryl, a $(C_7-C_{16})$ aralkyl, an amine, or a thioalkyl; and wherein each alkyl may be linear or branched, and saturated or unsaturated.

In one embodiment, the hydrocarbyl groups are each independently selected from $(C_1-C_{12})$ alkyl, $(C_6-C_{12})$ aryl, or $(C_7-C_{16})$ aralkyl.

In one embodiment, R10, R11, R12, R13 and R14 are the same or different, and are each independently selected from hydrogen (H), $(C_1-C_{16})$ alkyl, or $(C_1-C_{16})$ trialkylsilyl; and alkyl especially includes Me, Et, Pr and Bu.

In one embodiment, R9 is selected from $(C_1-C_{16})$ divalent alkyl group, or a $(C_1-C_{16})$ divalent trialkylsilyl group; and divalent alkyl groups especially include divalent Me, Et, Pr and Bu groups.

In one embodiment, R9 is an alkylene. In a further embodiment, the alkylene is selected from —CH2- (methylene), —(CH2)2- (ethylidene), —(CH2)3- (propylidene) and —(CH2)4- (butylidene).

In one embodiment, R9 is a divalent aralkylene group. In a further embodiment, the aralkylene group is selected from —CH2-C6H4-CH2- (xylidene) or —C6H4-C(CH3)2-C6H4-.

In one embodiment, $R^{10}$, $R^{11}$, $R^{12}$, $R^{13}$ and $R^{14}$ are each, independently, an alkyl. In a further embodiment, the alkyl is selected from CH3- (methyl), CH3-CH2- (ethyl), CH3-(CH2)2- (propyl), CH3-(CH2)3- (n-butyl) and CH3-C(CH3)2- (tert.-butyl).

In one embodiment, for each formula 3-6, $R^{13}$ is a C1-C4 alkyl, and preferably methyl, ethyl, propyl isomer, or a butyl isomer.

In one embodiment, for each formula 3-6, $R^{10}$, $R^{11}$, $R^{12}$, $R^{13}$, $R^{14}$ are each individually selected from the group consisting of a linear C1-C6 alkyl, a cyclic C6-C12 alkyl, and a C6-C15 aryl.

In one embodiment, for each formula 3-6, R9 is selected from the group consisting of a linear C1-C10 alkyl (divalent), a cyclic C6-C12 alkyl (divalent), a C6-C15 aryl (divalent), and a C7-C12 alkylaryl (divalent).

Formula 4 may comprise a combination of two or more embodiments as described herein.

In one embodiment, the end-modification agent is the compound of Formula 5:

Formula 5 wherein:

N is nitrogen, O is oxygen;

$R^5$, $R^6$, $R^7$ and $R^8$ are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl) silyl, and wherein the hydrocarbyl groups are each independently selected from ($C_1$-$C_{16}$) alkyl, ($C_6$-$C_{16}$) aryl, or ($C_7$-$C_{16}$) aralkyl.

In one embodiment, the hydrocarbyl groups are each independently selected from ($C_1$-$C_{12}$) alkyl, ($C_6$-$C_{12}$) aryl, or ($C_7$-$C_{16}$) aralkyl.

In one embodiment, R5, R6, R7 and R8 are the same or different, and are each independently selected from hydrogen (H), ($C_1$-$C_{16}$) alkyl, or ($C_1$-$C_{16}$) trialkylsilyl; and alkyl especially includes Me, Et, Pr and Bu.

In one embodiment, R5, R6, R7 and R8 are each, independently, an alkyl. In a further embodiment, the alkyl is selected from CH3- (methyl), CH3-CH2- (ethyl), CH3-(CH2)2- (propyl), and CH3-(CH2)3.

In one embodiment, for each Formula 3-6, $R^5$, $R^6$, $R^7$, $R^8$ are each individually selected from the group consisting of an aliphatic C1-C10 alkyl, a linear C1-C15 alkyl, a C6-C15 aryl, and a C7-C15 alkylaryl.

Formula 5 may comprise a combination of two or more embodiments as described herein.

In one embodiment, the end-modification agent is the compound of Formula 6:

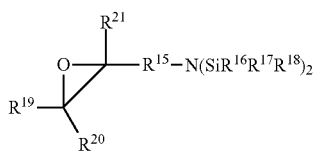

Formula 6 wherein:

Si is silicon; O is oxygen; N is nitrogen, $R^{15}$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, an amine, a thioalkyl, or combinations thereof; and wherein each alkyl may be linear or branched, and saturated or unsaturated;

$R^{16}$, $R^{17}$, $R^{18}$, $R^{19}$, $R^{20}$, and $R^{21}$ are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl, and wherein the hydrocarbyl groups are each independently selected from ($C_1$-$C_{16}$) alkyl, ($C_6$-$C_{16}$) aryl, or ($C_7$-$C_{16}$) aralkyl.

In one embodiment, $R^{15}$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or a thioalkyl; and wherein each alkyl may be linear or branched, and saturated or unsaturated.

In one embodiment, the hydrocarbyl groups are each independently selected from ($C_1$-$C_{12}$) alkyl, ($C_6$-$C_{12}$) aryl, or ($C_7$-$C_{16}$) aralkyl.

In one embodiment, R16, R17, R18, R19, R20 and R21 are the same or different, and are each independently selected from hydrogen (H), ($C_1$-$C_{16}$) alkyl, or ($C_1$-$C_{16}$) trialkylsilyl; and alkyl especially includes Me, Et, Pr and Bu.

In one embodiment, R15 is selected from ($C_1$-$C_{16}$) divalent alkyl group, or a ($C_1$-$C_{16}$) divalent aralkyl group; and divalent alkyl groups especially include divalent Me, Et, Pr and Bu groups.

In one embodiment, R15 is an alkylene. In a further embodiment, the alkylene is selected from —CH2- (methylene), —(CH2)2- (ethylidene), —(CH2)-3- (propylidene) and —(CH2)4- (butylidene).

In one embodiment, R15 is a divalent aralkylene group. In a further embodiment, the aralkylene group is selected from —CH2-C6H4-CH2- (xylidene) or —C6H4-C(CH3)2-C6H4-.

In one embodiment, R16, R17, R18, R19, R20 and R21 are each, independently, an alkyl. In a further embodiment, the alkyl is selected from CH3- (methyl), CH3-CH2- (ethyl), CH3-(CH2)2- (propyl), CH3-(CH2)3- (n-butyl) and CH3-C(CH3)2- (tert.-butyl).

In one embodiment, for each formula 3-6, $R^{16}$, $R^{17}$, $R^{18}$, are each individually selected from the group consisting of a linear C1-C6 alkyl, a cyclic C6-C12 alkyl, and a C6-C15 aryl.

In one embodiment, for each Formula 3-6, $R^{15}$ is selected from the group consisting of a linear C1-C10 alkyl (divalent), a cyclic C6-C12 alkyl (divalent), a C6-C15 aryl (divalent), and a C7-C12 alkylaryl (divalent).

In one embodiment, for each formula 3-6, $R^{19}$, $R^{29}$, $R^{21}$ are each individually selected from the group consisting of an aliphatic C1-C10 alkyl, a linear C1-C15 alkyl, a C6-C15 aryl, and a C7-C15 alkylaryl.

Formula 6 may comprise a combination of two or more embodiments as described herein.

The term "alkyl," as used herein, refers to at least one aliphatic group, and may also refer to two or more aliphatic groups. The alkyl group may be linear, branched, cyclic, or a combination thereof, and saturated or unsaturated. The term "alkyl" is understood to include both straight chain aliphatic hydrocarbon groups, (for example, methyl (Me), ethyl (Et), n-propyl (Pr), n-butyl (Bu), n-pentyl, n-hexyl, etc.), branched aliphatic hydrocarbon groups (for example, isopropyl, tert-butyl, etc.) and carbon based non-aromatic rings, aliphatic hydrocarbon groups. Here, "alkyl" refers to saturated linear, branched, cyclic, or combinations thereof, aliphatic hydrocarbon groups, and unsaturated, linear, branched, cyclic, or combinations thereof, aliphatic hydrocarbon groups. It is understood that an alkyl group used as R4, R9 or R15 moiety, as described herein, would be at least divalent.

The term "aryl," as used herein, refers to at least one aromatic ring, and may also refer to two or more aromatic rings. The term "aryl" is understood to include phenyls, biphenyls and other benzenoid compounds, each optionally substituted with alkyl, alkoxy, or other heteroatoms, such as oxygen, nitrogen, sulfur and phosphorous containing moieties. It is understood that an aryl group used as a R4, R9 or R15 moiety, as described herein, would be at least divalent.

The term "alkoxy" is understood to include methoxy (MeO), ethoxy (EtO), propoxy (PrO), butoxy (BuO), isopropoxy, isobutoxy, pentoxy, and the like.

The term "aralkyl," as used herein, refers to at least one aromatic ring, and also at least one alkyl group. The term "aralkyl" is understood to mean an aryl group bonded to an alkyl group. It is understood that an aralkyl group used as R4, R9 and R15, as described herein, would be at least divalent.

The designation of ($C_a$-$C_b$), for example ($C_1$-$C_{100}$), as used herein, is intended to mean a range of carbon atoms from a to b, and includes all individual values and subranges from a to b.

While not shown in Formula 1 or 2, it will be understood that the subject compounds include their corresponding Lewis base adducts (for example, with solvent molecules tetrahydrofuran, diethylether, dimethoxyethane coordinated with silicon atoms).

More preferably, the subject end-modifier compound is selected from the class defined by Formula 3 and 4. Even more preferably, the subject modifier is selected from the class defined by Formula 3:

$$(R^1O)_x(R^2)_ySi-R^4-S-SiR^3_3, \quad \text{Formula 3}$$

wherein:
Si is silicon; S is sulfur; O is oxygen;
x is an integer selected from 1, and 2;
y is an integer selected from 1, and 2;
x+y=3;
$R^4$ is $(C_7-C_{100})$ aralkyl, $(C_6-C_{100})$ aryl, $(C_1-C_{100})$ alkyl, or $(C_2-C_{100})$ dialkylether (alkyl-O-alkyl), and wherein each alkyl may be linear or branched;
$R^1$, $R^2$ and $R^3$ are the same or different, and are each, independently, selected from hydrogen (H), $(C_1-C_{16})$ alkyl, $(C_6-C_{16})$ aryl, $(C_7-C_{16})$ aralkyl or $(C_3-C_{30})$ tri(hydrocarbyl) silyl, and wherein the hydrocarbyl groups are each independently selected from $(C_1-C_{16})$ alkyl, $(C_6-C_{16})$ aryl, or $(C_7-C_{16})$ aralkyl.

While not shown in Formula 3, it will be understood that the subject compounds include their corresponding Lewis base adducts (e.g. with solvent molecules tetrahydrofurane, diethylether, dimethoxyethane coordinated with silicon atoms). Specific preferred species of the subject modifier include the compounds (and their corresponding Lewis base adducts which are not shown) represented by the following formulae:
(MeO)$_2$(Me)Si—(CH$_2$)$_3$—S—SiMe$_3$, (EtO)$_2$(Me)Si—(CH$_2$)$_3$—S—SiMe$_3$, (PrO)$_2$(Me)Si—(CH$_2$)$_3$—S—SiMe$_3$, (BuO)$_2$(Me)Si—(CH$_2$)$_3$—S—SiMe$_3$, (MeO)$_2$(Me)Si—(CH$_2$)$_2$—S—SiMe$_3$, (EtO)$_2$(Me)Si—(CH$_2$)$_2$—S—SiMe$_3$, (PrO)$_2$(Me)Si—(CH$_2$)$_2$—S—SiMe$_3$, (BuO)$_2$(Me)Si—(CH$_2$)$_2$—S—SiMe$_3$, (MeO)$_2$(Me)Si—CH$_2$—S—SiMe$_3$, (EtO)$_2$(Me)Si—CH$_2$—S—SiMe$_3$, (PrO)$_2$(Me)Si—CH$_2$—S—SiMe$_3$, (BuO)$_2$(Me)Si—CH$_2$—S—SiMe$_3$, (MeO)$_2$(Me)Si—CH$_2$—CMe$_2$-CH$_2$—S—SiMe$_3$, (EtO)$_2$(Me)Si—CH$_2$—CMe$_2$-CH$_2$—S—SiMe$_3$, (PrO)$_2$(Me)Si—CH$_2$—CMe$_2$-CH$_2$—S—SiMe$_3$, (BuO)$_2$(Me)Si—CH$_2$—CMe$_2$-CH$_2$—S—SiMe$_3$, ((MeO)$_2$(Me)Si—CH$_2$—C(H)Me-CH$_2$—S—SiMe$_3$, (EtO)$_2$(Me)Si—CH$_2$—C(H)Me-CH$_2$—S—SiMe$_3$, (PrO)$_2$(Me)Si—CH$_2$—C(H)Me-CH$_2$—S—SiMe$_3$, (BuO)$_2$(Me)Si—CH$_2$—C(H)Me-CH$_2$—S—SiMe$_3$, (MeO)(Me)$_2$Si—(CH$_2$)$_3$—S—SiMe$_3$, (EtO)(Me)$_2$Si—(CH$_2$)$_3$—S—SiMe$_3$, (PrO) Me)$_2$Si—(CH$_2$)$_3$—S—SiMe$_3$, (BuO)(Me)$_2$ Si—(CH$_2$)$_3$—S—SiMe$_3$, (MeO) (Me)$_2$Si—(CH$_2$)$_2$—S—SiMe$_3$, (EtO) (Me)$_2$Si—(CH$_2$)$_2$—S—SiMe$_3$, (PrO) (Me)$_2$ Si—(CH$_2$)$_2$—S—SiMe$_3$, (BuO) (Me)$_2$Si—(CH$_2$)$_2$—S—SiMe$_3$, (MeO) (Me)$_2$Si—CH$_2$—S—SiMe$_3$, (EtO)(Me)$_2$Si—CH$_2$—S—SiMe$_3$, (PrO) (Me)$_2$Si—CH$_2$—S—SiMe$_3$, (BuO)(Me)$_2$Si—CH$_2$—S—SiMe$_3$, (MeO) (Me)$_2$Si—CH$_2$—CMe$_2$-CH$_2$—S—SiMe$_3$, (EtO)(Me)$_2$Si—CH$_2$—CMe$_2$-CH$_2$—S—SiMe$_3$, (PrO) (Me)$_2$Si—CH$_2$—CMe$_2$-CH$_2$—S—SiMe$_3$, (BuO)(Me)$_2$Si—CH$_2$—CMe$_2$-CH$_2$—S—SiMe$_3$, ((MeO)(Me)$_2$Si—CH$_2$—C(H)Me-CH$_2$—S—SiMe$_3$, (EtO) (Me)$_2$Si—CH$_2$—C(H)Me-CH$_2$—S—SiMe$_3$, (PrO)(Me)$_2$ Si—CH$_2$—C(H)Me-CH$_2$—S—SiMe$_3$, (BuO)(Me)$_2$ CH$_2$—C(H)Me-CH$_2$—S—SiMe$_3$, (MeO)$_2$(Me)Si—(CH$_2$)$_3$—S—SiEt$_3$, (EtO)$_2$(Me)Si—(CH$_2$)$_3$—S—SiEt$_3$, (PrO)$_2$(Me)Si—(CH$_2$)$_3$—S—SiEt$_3$, (BuO)$_2$(Me)Si—(CH$_2$)$_3$ —S—SiEt$_3$, (MeO)$_2$(Me)Si—(CH$_2$)$_2$—S—SiEt$_3$, (EtO)$_2$(Me)Si—(CH$_2$)$_2$—S—SiEt$_3$, (PrO)$_2$(Me)Si—(CH$_2$)$_2$—S—SiEt$_3$, (BuO)$_2$(Me)Si—(CH$_2$)$_2$—S—SiEt$_3$, (MeO)$_2$(Me)Si—CH$_2$—S—SiEt$_3$, (EtO)$_2$(Me)Si—CH$_2$—S—SiEt$_3$, (PrO)$_2$(Me)Si—CH$_2$—S—SiEt$_3$, (BuO)$_2$(Me)Si—CH$_2$—S—SiEt$_3$, (MeO)$_2$(Me)Si—CH$_2$—CMe$_2$-CH$_2$—S—SiEt$_3$, (EtO)$_2$(Me)Si—CH$_2$—CMe$_2$-CH$_2$—S—SiEt$_3$, (PrO)$_2$(Me)Si—CH$_2$—CMe$_2$-CH$_2$—S—SiEt$_3$, (BuO)$_2$(Me)Si—CH$_2$—CMe$_2$-CH$_2$—S—SiEt$_3$, ((MeO)$_2$(Me)Si—CH$_2$—C(H)Me-CH$_2$—S—SiEt$_3$, (EtO)$_2$(Me)Si—CH$_2$—C(H)Me-CH$_2$—S—SiEt$_3$, (PrO)$_2$(Me)Si—CH$_2$—C(H)Me-CH$_2$—S—SiEt$_3$, (BuO)$_2$(Me)Si—CH$_2$—C(H)Me-CH$_2$—S—SiEt$_3$, (MeO) (Me)$_2$Si—(CH$_2$)$_3$—S—SiEt$_3$, (EtO)(Me)$_2$Si—(CH$_2$)$_3$—S—SiEt$_3$, (PrO) Me)$_2$Si—(CH$_2$)$_3$—S—SiEt$_3$, (BuO)(Me)$_2$ Si—(CH$_2$)$_3$—S—SiEt$_3$, (MeO)(Me)$_2$Si—(CH$_2$)$_2$—S—SiEt$_3$, (EtO)(Me)$_2$Si—(CH$_2$)$_2$—S—SiEt$_3$, (PrO)(Me)$_2$Si—(CH$_2$)$_2$—S—SiEt$_3$, (BuO)(Me)$_2$Si—(CH$_2$)$_2$—S—SiEt$_3$, (MeO)(Me)$_2$Si—CH$_2$—S—SiEt$_3$, (EtO) (Me)$_2$Si—CH$_2$—S—SiEt$_3$, (PrO)(Me)$_2$Si—CH$_2$—S—SiEt$_3$, (BuO)(Me)$_2$Si—CH$_2$—S—SiEt$_3$, (MeO)(Me)$_2$Si—CH$_2$—CMe$_2$-CH$_2$—S—SiEt$_3$, (EtO)(Me)$_2$Si—CH$_2$—CMe$_2$-CH$_2$—S—SiEt$_3$, (PrO)(Me)$_2$Si—CH$_2$—CMe$_2$-CH$_2$—S—SiEt$_3$, (BuO)(Me)$_2$ Si—CH$_2$—CMe$_2$-CH$_2$—S—SiEt$_3$, (MeO)(Me)$_2$Si—CH$_2$—C(H)Me-CH$_2$—S—SiEt$_3$, (EtO)(Me)$_2$Si—CH$_2$—C(H)Me-CH$_2$—S—SiEt$_3$, (PrO)(Me)$_2$Si—CH$_2$—C(H)Me-CH$_2$—S—SiEt$_3$, and (BuO)(Me)$_2$Si—CH$_2$—C(H)Me-CH$_2$—S—SiEt$_3$.

The end modification agent according to Formula 3 of the present invention may be prepared by reacting a sulfur containing compound according to Formula 10:

$$(R^1O)_x(R^2)_ySi-R^4-S-H \quad \text{(Formula 10)},$$

wherein the symbols have the same meaning as defined with respect to Formula 3, with a compound according to Formula 8:

$$QSiR_3 \quad \text{(Formula 8)},$$

wherein Q is fluorine, chlorine or bromine atom.

The end modification agent according to formula 3 of the present invention may be also prepared by reacting a sulfur containing compound according to Formula 11:

$$(R^1O)_3Si-R^4-S-M \quad \text{(Formula 11)},$$

wherein M is lithium, sodium or potassium and the other symbols have the same meaning as defined with respect to Formula 3, with a compound according to Formula 8:

$$QSiR_3 \quad \text{(Formula 8)},$$

wherein Q is fluorine, chlorine or bromine atom.

The subject end modification agent includes the sulfanylsilane compounds described in U.S. Pat. No. 6,229,036 and in patent application WO 2007047943 (which, to the fullest extent permitted by law, are incorporated herein by reference, including the methods for preparing sulfanylsilane compounds).

The end modification agent may be added intermittently (or at regular or irregular intervals) or continuously during the polymerization, but is preferably added at a conversion rate of the polymerization of more than 80%, and more preferably at a conversion rate of more than 90 percent. Preferably, a substantial amount of the polymer chain ends are not terminated prior to the reaction with the end modification agent; that is, the living polymer chain ends are present and capable of reacting with the end modification agent in a polymer chain end modification reaction. The end modification reaction may be before, after or during the addition of the modified coupling agent. Preferably the end-modification reaction is completed after the addition of the modified coupling agent.

In one embodiment, more than 20 percent of the polymer chain ends, as determined by GPC, are reacted with a modified coupling agent(s) prior to addition of the end-modification agent. In yet other embodiments, more than 35 percent of the polymer chain ends are reacted with a modified coupling agent(s) prior to addition of the end-modification agent.

In one embodiment, more than 20 percent, preferably more than 35 percent, and even more preferably more than 50 percent of the polymer chains, as determined by GPC, formed in the course of the polymerization process are linked with an end-modification agent in the process of polymer end-modification.

In one embodiment, from 20 to 35 percent of the living polymer chain ends, as determined by GPC, are reacted with a end-modification agent(s) prior to addition of the end-modification agent. In another embodiments, between 35 and 50 percent of the living polymer chain ends, as determined by GPC, are reacted with a end-modification agent(s) prior to addition of the end-modification agent. In yet other embodiment, between 50 and 80 percent of the living polymer chain ends are reacted with a end-modification agent(s) prior to addition of the end-modification agent.

In one embodiment, more than 50 percent, preferably more than 60 percent, and more preferably more than 75 percent, as determined by GPC, of the macromolecules formed in the reaction with the end-modification agent are believed to result in end-modified elastomeric polymers. End-modified elastomeric polymers according to the invention are defined to have formed polymer molecules comprising A) one functionality derived from the end-modification agent and B) one polymer chain (being equivalent with one polymer arm) derived from one living polymer chain.

The end modification agent may be directly added into the polymer solution without dilution; however, it may be beneficial to provide addition of the end modification agent in solution, such as in an inert solvent (e.g. cyclohexane). The amount of end modification agent added to the polymerization varies depending upon the monomer species, modified coupling agent, end modification agent, reaction conditions, and desired end properties but is generally from 0.05 to 5 mol-equivalent, preferably from 0.1 to 2.0 mol-equivalent and most preferably from 0.2 to 1.5 mol-equivalent per mol equivalent of alkali metal in the organic alkali metal compound required as initiator for the polymerization. The polymer end-modification reaction may be carried out in a temperature range of 0° C. to 150° C., preferably between 15° C. and 100° C. and even more preferably between 25° C. and 80° C. There is no limitation for the duration of the end-modification reaction, however with respect to an economical polymerization process; in case of a batch polymerization process, the end-modification reaction is usually stopped about 5 to 60 minutes after the addition of the modifier.

In one embodiment the linear chain-end modified elastomeric polymer is represented by Formula P2:

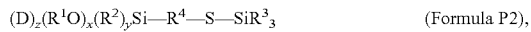
(D)$_z$(R$^1$O)$_x$(R$^2$)$_y$Si—R$^4$—S—SiR$^3_3$ (Formula P2), wherein D is an elastomeric polymer chain, x is an integer selected from 0 and 1; y is an integer selected from 1, and 2; z is an integer selected from 1, and x+y+z=3, and all other symbols are as previous defined with respect to Formula 3. While not shown in Formula P2, it will be understood that the subject compound(s) include their corresponding Lewis base adducts.

While not wishing to be bound by theory, the trialkyl-, triaralkyl, or triarylsilyl (—SiR$_3$) group of Formula P2 and P1 is believed to function as a protective group which prevents unintended subsequent reaction. This "protective" trialkyl-, triaralkyl, or triarylsilyl (—SiR$_3$) may be removed by exposure to a compounds containing —OH groups such water, alcohols, anionic acids or organic acids, (e.g. hydrochloric acid, sulfuric acid or carboxylic acids), thus forming an "unprotected" thiol (—SH) group. Such conditions are typically present during vulcanization. Depending on the polymer "work up" conditions, both the unprotected and/or protected modified elastomeric polymers may be present. For example, steam stripping of the polymer solution containing the modified polymer according to Formula 5 will remove a percentage of the protecting trialkyl-, triaralkyl, or triarylsilyl groups resulting in the unprotected form with the thiol (—SH) group exposed. The percentage of removed protective groups can be very different depending on to the structure of the R-group in the —SiR$_3$ moiety of the polymer macromolecule in Formula P2 and P1.

Alternatively, a water-free work up procedure can be used for the preparation of the modified polymers according to Formula P2 and P1.

It is believed that the unprotected thiol (—SH) group of the modified elastomeric polymer is reactive with both unsaturated portions of the polymer backbone, and fillers (such as silica and/or carbon black) present. This interaction is believed to result in the formation of bonds toward polymer backbones or fillers, or in the case of some fillers, in electrostatic interactions which result in more homogeneous distribution of filler within an elastomeric polymer compositions.

The resulting polymer comprising modified branched polymer macromolecules and linear end-modified polymer macromolecules preferably comprises sulfide and thiol groups in a total amount from 0.0005 to 0.20 or 0.0010 to 0.20 mmol/gram of elastomeric polymer, preferably from 0.0005 to 0.10 mmol/gram, and more preferably from 0.0010 to 0.1 mmol/gram, and even more preferably from 0.0015 to 0.05 or 0.0020 to 0.05 mmol/gram of polymer. In another embodiment, the sulfide groups are present in an amount less than, or equal to, 0.20 mmol/gram of elastomeric polymer, preferably less than, or equal to, 0.10 mmol/gram, and more preferably less than, or equal to, 0.05 mmol/gram. In another embodiment, the sulfide groups are present in an amount greater than, or equal to, 0.0005 mmol/gram of elastomeric polymer, preferably greater than, or equal to 0.0010 mmol/gram, and more preferably greater than, or equal to, 0.0020 mmol/gram.

For most applications, the modified polymer is preferably: a homopolymer derived from a conjugated diolefin, a copolymer derived from a conjugated diolefin monomer with an aromatic vinyl monomer, and/or a terpolymer of one or two types of conjugated diolefins with one or two types of aromatic vinyl compounds. More preferably, the modified polymer is a copolymer of a conjugated diolefin monomer with an aromatic vinyl monomer, e.g. a copolymer of butadiene with styrene with a sulfide group (e.g. thiol) bonded to at least some linear polymer chain ends and to at least some branched polymers at a central position.

Although there are no specific limitations regarding the content of 1,2-bonds and/or 3,4-bonds (hereinafter called "vinyl bonds") of the conjugation diolefin portion of the elastomeric polymer, for most applications, the vinyl bond content is preferably from 10 to 90 weight percentage, and particularly preferably from 15 to 80 weight percentage (based on total weight of elastomeric polymer). If the vinyl bond content in an elastomeric polymer is less than 10 weight percentage, the resulting product may have inferior wet skid resistance. If the vinyl content in the elastomeric polymer exceeds 90 weight percentage vinyl bonds, the product may exhibit compromised tensile strength and abrasion resistance, and relatively large hysteresis loss.

Although there are no specific limitations regarding the amount of aromatic vinyl monomer used in the subject modified elastomeric polymer, in most applications the aromatic vinyl monomers comprise from 5 to 60 weight percentage of the total monomer content, and more preferably from 10 to 50 weight percentage (based on total weight of elastomeric polymer). Values less than 5 weight percentage can lead to reduced wet skid properties, abrasion resistance, and tensile strength; whereas values more than 60 weight percentage lead to increased hysteresis loss. The modified elastomeric polymer may be a block or random copolymer, but is preferably 40 weight percentage, or more, of the aromatic vinyl compound units are linked singly, and 10 weight percentage, or less, are of "blocks" in which eight or more aromatic vinyl compounds are linked successively. Copolymers falling outside this range often exhibit increased hysteresis. The length of successively linked aromatic vinyl units can be measured by an ozonolysis-gel permeation chromatography method developed by Tanaka, et al. (Polymer, Vol. 22, Pages 1721-1723 (1981)).

While dependant upon the specific polymer and desired end use application, the modified polymers of the present invention preferably have Mooney viscosity (ML 1+4, 100° C., as measured in accordance with ASTM D 1646 (2004)) in the range from 20 to 150, and preferably from 30 to 100, using a Monsanto MV2000 instrument.) If the Mooney viscosity (ML 1+4, 100° C.) is less than 20, abrasion resistance and hysteresis loss properties are compromised. Moreover, tack and cold flow of the uncrosslinked elastomeric polymer are increased, resulting in difficult handling, poor green strength and poor dimensional stability during storage. If the Mooney viscosity (ML 1+4, 100° C.) of the polymer is more than 150, processability (filler incorporation and heat build up in the internal mixer, banding on the roll mill, extrusion rate, extrudate die swell, smoothness, etc.) is impaired, and the cost of processing increases.

The preferred molecular weight distribution of the subject modified polymer, represented by the ratio of the weight average molecular weight to the number average molecular weight, ($M_w/M_n$), ranges preferably from 1.2 to 3.0. Processability of the polymer is impaired, if the Mw/Mn is less than 1.2. Poor processability not only increases cost of production, but also impairs blending characteristics of components, such as insufficient dispersion of fillers and other additives, which may result in poor physical properties. If Mw/Mn is more than 3.0, the content of low molecular weight components increases and hysteresis loss increases.

Extender oils may be used in combination with the subject uncrosslinked elastomeric polymers to reduce viscosity or Mooney values. Applicable extender oils include mineral oils which are mixtures of aromatic-type oil, alicyclic-type oil, and aliphatic-type oil, and are classified as an aromatic-type extender oil, alicyclic-type extender oil, or aliphatic-type extender oil. Among these, aromatic-type mineral oil having a viscosity gravity constant (V.G.C. value) of 0.900-1.049 (aromatic oil) and an alicyclic-type mineral oil having a V.G.C. value of 0.850-0.899 (naphthenic oil) are particularly preferable to ensure optimal low temperature hysteresis loss properties resulting in excellent wet skid resistance. Mentioned oils include MES (Mild Extraction Solvate), TDAE (Treated Distillate Aromatic Extract, RAE (Residual Aromatic Extract), DAE and NAP (naphtenic). Also native oils can be used as extender oil. Aforementioned oils comprise different concentrations of polycyclic aromatic compounds, parafinics, naphthenics and aromatics and have different glass transition temperatures. The above mentioned types of oil are characterized in journal "Kautschuk Gummi Kunststoffe", vol. 52, pages 799-805. to MES and TDAE are especially preferred extender oils for rubber.

Such extension of modified polymer of the subject invention with extender oil ensures homogeneous dispersion of fillers, such as carbon black and silica in the polymer, and improves processability and various properties of vulcanized products. The amount of extender oil used in the present invention is from 0 to 100 parts by weight, preferably from 0 to 80 parts by weight, and more preferably from 0 to 70 parts by weight, for 100 parts by weight modified uncrosslinked elastomeric polymer. When the extender oil is added to the polymer solution, the timing of addition should be after modification of the polymer or termination of the polymerization, for example, after the addition of the modifier or polymerization termination agent. After the addition of extender oil, the oil-extended polymer is obtained by separating the polymer from solvent by a direct drying method or steam stripping, drying the rubber using a vacuum dryer, hot-air dryer, roller, or the like. By way of example, U.S. Publication 2005/0159513 discloses an oil extended rubber composition comprising a solution-polymerized uncrosslinked elastomeric polymer coupled with a silicon or tin coupling agent, and a low polycyclic aromatic oil.

In an important embodiment, the subject modified elastomeric polymer is combined and reacted with filler(s) and vulcanization agent, and, optionally, additional constituents, including, but not limited to, accelerators, coupling agents, and unmodified uncrosslinked elastomeric polymers (i.e. conventional uncrosslinked elastomeric polymers that have not been reacted with the subject modifiers, but that have been prepared and terminated as is conventional in the art). The term "uncrosslinked elastomeric polymer composition" is intended to describe the reaction product resulting from this combination. The resulting uncrosslinked elastomeric polymer composition is typically molded into a desired configuration or shape and vulcanized to form cross-linked elastomeric articles comprising cross-linked elastomeric polymer compositions, such as a tire.

The subject modified elastomeric polymer (include oil extended embodiments) preferably comprises at least 30 weight percentage of the total elastomeric polymer present, and more preferably at least 50 weight percentage. The remaining portion of the elastomeric polymer is unmodified elastomeric polymer. Preferred unmodified elastomeric polymers include: cis-1,4-isoprene polymer, natural rubber, 3,4-isoprene polymer, styrene/butadiene copolymer polymer, styrene/isoprene/butadiene terpolymer, cis-1,4-butadiene polymer, trans-1,4-butadiene polymer, low to high vinyl butadiene polymers (having a vinyl content of 10-90%), acrylonitrile/butadiene copolymers, and chloroprene polymers. Of these, styrene-butadiene copolymer, natural rubbers, polyisoprene, and polybutadiene are preferable. It is desirable that the unmodified polymers have a Mooney viscosity (ML 1+4, 100° C. (ASTM D 1646 (2004), as discussed above) in the range from 20 to 200, and preferably from 25 to 150. The addition of unmodified polymers in the above range ensures manufacturing of the elastomeric composition of the present invention at a low cost, without substantially impairing its characteristics.

The subject elastomeric composition preferably includes fillers, which serve as reinforcement agents. Carbon black, silica, carbon-silica dual-phase-filler, clay, calcium carbonate, magnesium carbonate, and the like, are examples. Of these, the combined use of carbon black and silica, the use of carbon-silica dual-phase-fillers alone, or the combined use of carbon-silica dual-phase-filler and carbon black and/or silica are preferable. Carbon black is manufactured by a furnace method and having a nitrogen adsorption specific surface area of 50-200 $m^2/g$ and DBP oil absorption of 80-200 ml/100 grams, for example, FEF; HAF, ISAF, or SAF class carbon black, is preferable. High agglomeration type carbon black is particularly preferable. Carbon black is typically added in an amount from 2 to 100 parts by weight, and preferably from 5 to 100 parts by weight, more preferably 10 to 100 parts by weight, and even more preferably 10 to 95 parts by weight, for 100 parts by weight of the total elastomeric polymer.

Examples of silica fillers include the following: wet process silica, dry process silica, and synthetic silicate-type silica. Silica with a small particle diameter exhibits a high reinforcing effect. Small diameter, high agglomeration-type silica (i.e. that having a large surface area and high oil absorptivity) exhibits excellent dispersability in the elastomeric polymer composition, representing desirable properties, and superior processability. An average particle diameter of silica, in terms of a primary particle diameter, is preferably from 5 to 60 nm, and more preferably from 10 to 35 nm. Moreover, the specific surface area of the silica particles (measured by the BET method) is preferably from 45 to 280 $m^2/g$. Silica is added in an amount from 10 to 100 parts by weight, preferably 30 to 100 parts by weight, and even more preferably from 30 to 95 parts by weight, for 100 parts by weight of the total elastomeric polymer.

Carbon black and silica may be added together, in which case the total amount of carbon black and silica added is from 30 to 100 parts by weight, and preferably from 30 to 95 parts by weight for 100 parts by weight of the total elastomeric polymer. So long as such fillers are homogeneously dispersed in the elastomeric composition, increasing quantities (within the above cited ranges) result in compositions having excellent rolling and extruding processability, and vulcanized products exhibiting favorable hysteresis loss properties, rolling resistance, improved wet skid resistance, abrasion resistance, and tensile strength.

Carbon-silica dual-phase-filler may be used either independently or in combination with carbon black and/or silica in the present invention. Carbon-silica dual-phase-filler can exhibit the same effects as those obtained by the combined use of carbon black and silica, even in the case where this is added alone. Carbon-silica dual-phase-filler is so called silica-coated-carbon black made by coating silica over the surface of carbon black, and is commercially available under the trademark CRX2000, CRX2002, or CRX2006 (products of Cabot Co.). Carbon-silica dual-phase-filler is added in the same amounts as previously described with respect to silica. Carbon-silica dual-phase-filler can be used in combinations with other fillers, for example, carbon black, silica, clay, calcium carbonate, and magnesium carbonate. Of these fillers, use of carbon black and silica, either individually or in combination, is preferable.

Silica, carbon black or carbon black-silica dual-phase-fillers or combinations thereof can be used in combination with natural fillers, such as, for example, starch.

It is preferable to add a silane coupling agent to the polymer composition when silica or carbon-silica dual-phase-filler is used. The typical amount of a silane coupling agent added is from about 1 to about 20 parts by weight, and preferably from 5 to 15 parts by weight, for 100 parts by weight of the total amount of silica and/or carbon-silica dual-phase-filler. A silane coupling agent, which has both a functional group reactive with silica surface, such as, for example, but not limited to, an alkoxysilyl group, and a functional group reactive with a carbon-carbon double bond of polymer, such as polysulfide group, mercapto group, or epoxy group, in the molecule is preferable, including bis-(3-triethoxysilylpropyl) tetrasulfide, bis-(3-triethoxysilylpropyl)disulfide, bis-(2-triethoxysilyethyl)tetrasulfide, bis-(2-triethoxysilylethyl)disulfide, 3-mercaptopropyltrimethoxysilane, 3-triethoxysilylpropyl-N,N-dimethylthiocarbamoyltetrasulfide, 3-triethoxysilylpropylbenzothiazole tetrasulfide, 3-octanoylthio-1-propyltriethoxysilane (NXT silane, © Crompton Corporation). The use of such a silane coupling agent increases the reinforcing effect brought about by the combined use of carbon black and silica or the use of carbon-silica dual-phase-filler.

Sulfur, sulfur-containing compounds and peroxides are the most common vulcanizing agents. A vulcanizing accelerator of sulfene amide-type, guanidine-type, or thiuram-type can be used together with a vulcanizing agent, as required. Other additives such as zinc white, vulcanization auxiliaries, aging preventives, processing adjuvants, and the like may be optionally added. A vulcanizing agent is typically added to the polymer composition in an amount from 0.5 to 10 parts by weight, and preferably from 1 to 6 parts by weight, for 100 parts by weight of the total elastomeric polymer. Additional information regarding vulcanizing agents can be found in Kirk-Othmer, Encyclopedia of Chemical technology $3^{rd}$, Ed, Wiley Interscience, N.Y. 1982, volume 20, pp. 365-468, specifically "Vulcanizing Agents and Auxiliary Materials" pp. 390-402.

The elastomeric polymer composition of the present invention can be prepared by kneading the above-described modified elastomeric polymers (including oil extended varieties), unmodified elastomeric polymers (including oil extended varieties), fillers (carbon black, silica, carbon-silica dual-phase-filler, etc.), silane coupling agents, oils, and other additives in a kneader at 140 to 180° C. After cooling, vulcanizing agents such as sulfur, vulcanizing accelerators, and the like are added, and the resulting mixture is blended using a Banbury mixer or open roll mill, formed into a desired shape, and vulcanized at 140 to 180° C., thereby obtaining a vulcanized elastomeric product.

Because the vulcanized elastomeric polymer compositions of the present invention exhibit low rolling resistance, low dynamic heat build up and superior wet skid performance, the elastomeric polymer compositions of the present invention are well suitable for use in preparing tires, tire treads, side walls, and carcasses, as well as other industrial products such as belts, hoses, vibration dampers, and footwear.

The present invention will be explained in more detail by way of examples, which are not intended to be limiting of the present invention.

EXAMPLES

The following Examples are provided in order to further illustrate the invention and are not to be construed as limiting. The Examples include the preparation of the subject modifiers, along with comparative modifiers; the preparation and testing of modified elastomeric polymers; and the preparation and testing of uncrosslinked, as well as of cross-linked, elastomeric polymer compositions. Unless stated to the contrary, all parts and percentages are expressed on a weight basis. The term "overnight" refers to a time of approximately 16-18 hours, and "room temperature" refers to a temperature of about 20-25° C. The polymerizations were performed under exclusion of moisture and oxygen, in a nitrogen atmosphere. Various methods were used to test and measure the Examples. A brief description of each technique is provided.

The ratio between the 1,4-cis-, 1,4-trans- and 1,2-polydiene content of the butadiene polymers or styrene-butadiene copolymers was determined by IR, $^1$H-NMR- and $^{13}$C-NMR-spectroscopy (NMR (AVANCE 400 device (1H=400 MHz; $^{13}$C=100 MHz) of Bruker Analytic GmbH). The vinyl content in the conjugated diolefin part was additionally determined by IR absorption spectrum (Morello method, IFS 66 FT-IR spectrometer of Bruker Analytic GmbH). The IR samples were prepared using $CS_2$ as swelling agent.

Bonded styrene content: A calibration curve was prepared by IR absorption spectrum (IR (IFS 66 FT-IR spectrometer of Bruker Analytik GmbH). The IR samples were prepared using $CS_2$ as swelling agent). For the IR determination of the bound styrene in styrene-butadiene copolymers are four bands viewed: a) band for trans-1,4-polybutadiene units at 966 $cm^{-1}$, b) band for cis-1,4-polybutadiene units at 730 $cm^{-1}$, c) band for 1,2-polybutadiene units at 910 $cm^{-1}$ and band for bound styrene (styrene aromatic bond) at 700 $cm^{-1}$. The band heights are normed according to the appropriate extinction coefficients and summarized to a total of 100%. The normalization is done via $^1H$- and $^{13}$-C-NMR. The styrene content was alternatively determined by NMR technique (NMR (AVANCE 400 device (1H=400 MHz; $^{13}$C=100 MHz) of Bruker Analytik GmbH)).

A single chain aromatic vinyl compound unit (a unit with an aromatic vinyl compound linked singly) and a long chain aromatic vinyl compound unit (a unit in which eight or more aromatic vinyl compounds are linked) was determined by NMR technique (NMR (AVANCE 400 device (1H=400 MHz; $^{13}$C=100 MHz) of Bruker Analytik GmbH)).

Polydispersity ($M_w/M_n$) was a measure for the width of molecular weight distribution. The calculation of $M_w$ and $M_n$ (weight average molecular weight ($M_w$) and number average molecular weight ($M_n$)), was based on one of two procedures, GPC-Method A or GPC-Method B.

GPC-Method A) SEC calibrated with narrow distributed polystyrene standard. The measurement was performed in THF at 40° C.). Instrument: AGILENT SERIE 1100/1200; Module setup: Iso pump, autosampler, thermostate, VW-Detector, RI-Detector, Degasser; Columns PL Mixed B/HP Mixed B.

GPC-Method B) SEC with coupled with light scattering. The measurement was performed in THF at room temperature. Light Scattering Instrument: MALS DAWN EOS from Wyatt, SEC: Waters Autosampler 717 plus, Waters RI Detector 410, Pump AGILENT SERIE 1100; 2 columns, 2×YMC-Pack-SIL-1000, SLA0S03-3008WT.

The Mp1, Mp2, Mp3, Mp4, Mp5 correspond to the (maximum peak) molecular weight measured at the first, second, third, fourth or fifths peaks of the GPC curve [the first peak (lowest molecular weight) is located on the right side of the curve and the last peak (highest molecular weight) is located on the left side of the curve], respectively. Maximum peak molecular weight means the molecular weight of the peak at the position of maximum peak intensity. The Mp2, Mp3, Mp4 and Mp5 are two, three, four or five polymer chains coupled to one macromolecule. Mp1 is one polymer chain (base molecular weight—no coupling of two or more polymer chains to one macromolecule).

The total coupling rate represents the sum of the weight fractions of coupled polymers relative to the total polymer weight, including the sum of the weight fractions of all coupled polymers and the uncoupled polymer. The total coupling rate are calculated as shown below.

CR(total)=(ΣArea of all coupled peaks[Peak with maximum Mp2 to peak with highest indexed peak maximum])/(ΣArea of all peaks[Peak with peak maximum Mp1 to peak with highest indexed peak maximum]).

The individual coupling rate (e.g. two polymer arms coupled corresponding to the peak with peak maximum Mp2) is calculated as depicted below CR(2arms)=(Area of peak with peak maximum Mp2)/(ΣArea of all peaks[Peak with peak maximum Mp1 to peak with highest indexed peak maximum]).

Sample Preparation:
a) 1 l tetrahydrofurane was stabilized with 20 mg stearylamine (no stabilizer (e.g. stearylamine) in case of GPC-method B)
b1) Oil free polymer samples:
About 9-11 mg dried polymer sample (moisture content<0.6%) was dissolved in 10 mL tetrahydrofurane, using a brown vial of 10 mL size. The polymer was dissolved by shaking the vial for 20 min at 200 u/min.
b2) oil containing polymer samples:
About 12-14 mg dried polymer sample (moisture content<0.6%) was dissolved in 10 mL tetrahydrofurane, using a brown vial of 10 mL size. The polymer was dissolved by shaking the vial for 20 min at 200 u/min
c) Polymer solution was transferred into a 2 ml vial using a 0.45 µm disposable filter.
d) The 2 ml vial was placed on a sampler for GPC-analysis. Injection volume: 100.00 µm (GPC-method B 50.00 µm) Elution rate: 1.00 mL/min Rubber compounds were prepared by combining the constituents listed below in Table 6, Table 9, Table 10 and Table 11 in a 380 cc Banbury mixer (Labstation 350S from Brabender GmbH&Co KG) following a two-stage mixing process. Stage 1—mixed all components together, except the components of the vulcanization package, to form a stage 1 formulation (or composition). Stage 2—components of vulcanization package were mixed into stage 1 formulation to form a stage 2 formulation (or composition).

Mooney viscosity was measured according to ASTM D 1646 (2004) with a preheating time of one minute and a rotor operation time of 4 minutes at a temperature of 100° C. [ML1+4(100° C.)] on a MV 2000E from Alpha Technologies UK. The rubber Mooney viscosity measurement is performed on dry (solvent free) raw polymer (unvulcanized rubber). The Compound Moony viscosity is measured on an uncured (unvulcanized) second state polymer compound sample prepared according to Tables 6, 9, 10 or 11.

Measurement of unvulcanized rheological properties was performed according to ASTM D 5289-95 (reapproved 2001), using a rotor-less shear rheometer (MDR 2000 E from Alpha Technologies UK) to measure Scorch Time (TS) and Time to Cure (TC). The rheometer measurement was performed at a constant temperature of 160° C. on an unvulcanized second stage polymer formulation, according to Tables 6, 9, 10 and 11. The amount of polymer sample was about 4.5 g. Sample shape and shape preparation are standardized, and defined by the measurement device (MDR 2000 E from Alpha Technologies UK).

The "TC 50" and "TC 90" are the respective times required to achieve 50% and 90% conversion of the vulcanization reaction. A torque is measured as a function of time of reaction. The vulcanization conversion is automatically calculated from the generated torque versus time curve. The "TS 1" and "TS 2" are the respective times required to increase the torque by 1 dNm and 2 dNm above the respective torque minimum (ML) during vulcanization.

Tensile Strength, Elongation at Break and Modulus at 300% Elongation (Modulus 300) were measured according to ASTM D 412-98A (reapproved 2002), using dumbell die C test pieces on a ZWICK Z010. Of the standardized dumbbell die C test pieces those of 2 mm thickness are used. The tensile strength measurement is performed at a room temperature of on a cured (vulcanized) second stage polymer sample prepared according to Tables 6, 9, 10 or 11. Stage 2 formulations were vulcanized at 160° C. to TC 95 (95% vulcanization conversion, about 16-25 minutes) (see cure data in Tables 7 and 12).

Heat build up was measured according to ASTM D 623, method A, on a DOLI 'GOODRICH'-FLEXOMETER. The heat built up measurement is performed on a vulcanized second stage polymer samples according to Tables 6, 9, 10 and 11. Stage 2 formulations were vulcanized at 160° C. to TC 95 (95% vulcanization conversion) (see cure data in Tables 7 and 12).

Tan δ at 60° C. and Tan δ at 0° C. as well as Tan δ at −10° C. measurements were performed on a cylindrical specimen, using the dynamic mechanical thermal spectrometer "EPLEXOR 150N" manufactured by Gabo Qualimeter Testanlagen GmbH (Germany), by applying a compression dynamic strain of 0.2% at a frequency of 2 Hz at the respective temperatures. The smaller the index at a temperature of 60° C., the lower is the rolling resistance (lower=better). Tan δ (0° C.) was measured using the same equipment and load conditions at 0° C. The larger the index at this temperature, the better the wet skid resistance (higher=better). Stage 2 formulations were vulcanized at 160° C. to TC 95 (95% vulcanization conversion) (see cure data in Tables 7 and 12). The process leads to the formation of visually bubble free, homogeneous cured rubber disc of 60 mm diameter and 10 mm height. A specimen is drilled out of the aforementioned dish, and has a size of 10 mm diameter and 10 mm height.

DIN abrasion was measured according to DIN 53516 (1987-06-01). The larger the index, the lower the wear resistance is (lower=better). The abrasion measurement is performed on a vulcanized second stage polymer formulation according to Tables 6, 9, 10 or 11. Stage 2 formulations were vulcanized at 160° C. to TC 95 (95% vulcanization conversion) (see cure data in Tables 7 and 12).

In general, the higher the values for Elongation at Break, Tensile Strength, Modulus 300, and Tan δ at 0° C., the better the sample performance; whereas the lower the Tan δ at 60° C., Heat Build Up, and Abrasion, the better the sample performance. Preferably TS 1 is greater than 1.5 minute, TS 2 is greater than 2.5 minute, TC 50 is from 3 to 8 minutes, and TC 90 is from 8 to 19 minutes.

Sulfur determination (XRF): the analysis was carried out with X-ray to fluorescence spectroscopy (XRF).
Sample preparation: The sample (about 2 g) is pressed in a hot press, at 160° C., for ten minutes, and cooled for five minutes. Calibration: The XRF spectrometer is calibrated with a sulfur oil standard which has a concentration of 1% sulfur.
Equipment: XRF spectrometer PANalytical "Axios", hot press LECO PR-25
Conditions: X-ray line: S Kα
Matrix correction: for the matrix correction, the fundamental parameter software PCFPW is used. PCFPW is a program from FUNDEX Software and Technology, Inc., Northridge, USA.

Modifier Preparation: Six chain-end modifier agents and four modified coupling agents were prepared as examples. The structural formula and method of preparation (or source for obtaining) are provided below. The combined use of chain-end modifier agents and modified coupling agents is representative for the present invention, whereas the combined use of "unmodified" coupling agents and chain-end modifier agents is for comparative purposes.

Preparation Pathway 1:

Modified Coupling Agent 1 is represented by Formula M1 below and was prepared as follows:

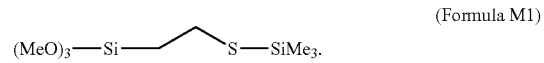

(Formula M1)

A 250 mL Schlenk flask was charged with 100 g cyclohexane, 8.6 g (85 mmol) triethylamine and 13.12 g (80 mmol) gamma-mercaptopropyl trimethoxy silane [Silquest A-189] from the Cromton GmbH. Trimethyl chloro silane (17.9 g (165 mmol)) was diluted with 50 g cyclohexane, and the resulting solution was then added drop wise to the Schlenk flask. Immediately a white triethylammonium chloride precipitated. The suspension was stirred for about 24 hours at room temperature, and for another three hours at 60° C. The white precipitate was subsequently separated by filtration. The resulting colorless solution was distilled under vacuum to yield 16 g (67.7 mmol) of modified coupling agent 1.

End Modification Agent 2 is represented by Formula M2 below and was prepared as follows:

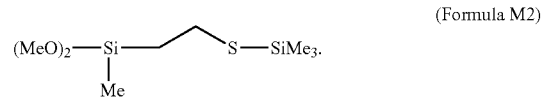

(Formula M2)

A 250 mL Schlenk flask was charged with 100 g cyclohexane, 8.6 g (85 mmol) triethylamine and 14.4 g (79.8 mmol) gamma-mercaptopropyl (methyl) dimethoxysilane from the ABCR GmbH. Trimethyl chloro silane (17.4 g (160 mmol)) were diluted with 50 g cyclohexane, and the resulting solution was then added drop wise to the Schlenk flask Immediately, a white triethylammonium chloride precipitated. The suspension was stirred for about 24 hours at room temperature, and for another three hours at 60° C. The white precipitate was subsequently separated by filtration. The resulting colorless solution was distilled under vacuum to yield 17.2 g (68.1 mmol) of end modification agent 2.

Preparation Pathway 2:

Modified Coupling Agent 1, represented by Formula M1 above, alternatively was prepared as follows.

To a 100 mL Schlenk flask was charged 25 ml tetrahydrofuran (THF), 79.5 mg (10 mmol) lithium hydride, and subsequently 1.80 g (10 mmol) gamma-mercaptopropyl trimethoxy silane [Silquest A-189] from the Cromton GmbH. The reaction mixture was stirred for 24 hours at room temperature, and another two hours at 50° C. Then trimethyl chloro silane (1.09 g (10 mmol)) was diluted with 10 g THF, and the resulting solution was then added drop wise to the Schlenk flask. Lithium chloride precipitated. The suspension was stirred for about 24 hours at room temperature, and for another two hours at 50° C. The THF solvent was removed under vacuum. Then cyclohexane (30 ml) was added. The white precipitate was subsequently separated by filtration. The cyclohexane solvent was removed under vacuum (under reduced pressure). The resulting colorless liquid solution proved to be 99% pure per GC, and therefore no further purification was necessary. A yield of 2.2 g (9.2 mmol) of modified coupling agent 1 was obtained.

Preparation Pathway 3:

Modified Coupling Agent 1, represented by Formula M1 above, alternatively was prepared as follows.

To a 100 mL Schlenk flask was charged 1.80 g (10 mmol) gamma-mercaptopropyl trimethoxy silane [Silquest A-189] from the Cromton GmbH, 25 ml tetrahydrofuran (THF), and subsequently 0.594 g (11 mmol) sodium methanolate (NaOMe) dissolved in 10 mL THF. The reaction mixture was stirred for 18 hours at room temperature. Then trimethyl chloro silane (1.09 g (10 mmol)) was diluted with 10 g THF, and the resulting solution was then added drop wise to the Schlenk flask. Sodium chloride precipitated. The suspension was stirred for about 24 hours at room temperature, and for another two hours at 50° C. The THF solvent was removed under vacuum. Then cyclohexane (30 ml) was added. The white precipitate was subsequently separated by filtration. The cyclohexane solvent was removed under vacuum (under reduced pressure). The resulting colorless liquid solution proved to be 89% pure per GC. Further purification consisted in a fractionated distillation, and a yield of 1.7 g (7.2 mmol) of modified coupling agent 1 was obtained.

The following Chain-End Modifier Agents were prepared according to Preparation Pathway 3. Reagent amounts are shown in Table A.

End Modification Agent 3 Represented by Formula M3 Below:

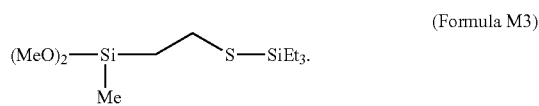
(Formula M3)

End Modification Agent 4 Represented by Formula M3 Below:

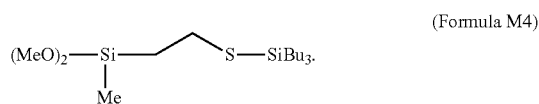
(Formula M4)

End Modification Agent 5 Represented by Formula M3 Below:

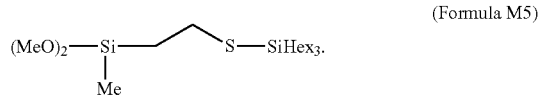
(Formula M5)

End Modification Agent 6 Represented by Formula M3 Below:

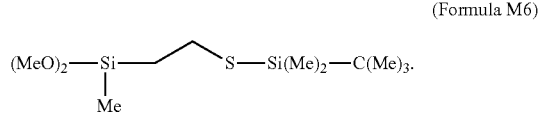
(Formula M6)

End Modification Agent 7 Represented by Formula M3 Below:

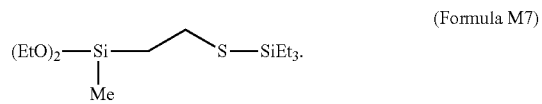
(Formula M7)

TABLE A

| End-Modifier No.* | Mercapto-propyl-di-ethoxy-silane [mmol] | Mercapto-propyl-di-methoxy-silane [mmol] | Lithium hydride [mmol] | Chloro-trialkyl-silane [mmol] | End-Modifier Agent Yield (GC) [%] |
|---|---|---|---|---|---|
| M2 | — | 10 | 10 | 10 | 92 |
| M3 | — | 10 | 10 | 10 | 89 |
| M4 | — | 10 | 10 | 10 | 76 |
| M5 | — | 10 | 10 | 10 | 71 |
| M6 | — | 10 | 10 | 10 | 68 |
| M7 | 20 | — | 20 | 20 | 85 |

The following Modified Coupling Agents were prepared according to Preparation Pathway 3. Reagent amounts are shown in Table B.

Modified Coupling Agent 8 Represented by Formula M3 Below:

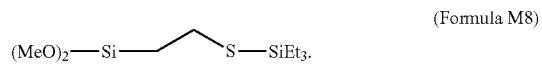
(Formula M8)

Modified Coupling Agent 9 Represented by Formula M3 Below:

(Formula M9)

Modified Coupling Agent 10 Represented by Formula M3 Below:

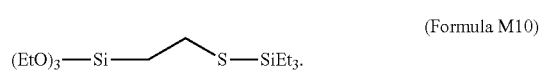
(Formula M10)

TABLE B

| Modified Coupling Agent No. | Mercapto-propyl-tri-ethoxy-silane [mmol] | Mercapto-propyl-tri-methoxy-silane [mmol] | Lithium hydride [mmol] | Chloro-trialkyl-silane [mmol] | Modified Coupling Agent Yield (GC) [%] |
|---|---|---|---|---|---|
| M1 | — | 10 | 10 | 10 | 99 |
| M8 | — | 10 | 10 | 10 | 83 |
| M9 | — | 10 | 10 | 10 | 87 |
| M10 | 20 | — | 20 | 20 | 89 |

Homopolymerization of 1,3-Butadiene

Examples 1, 1a, 1b, 1c and 1d

Polymerizations for Examples 1, 1a, 1b, 1c and 1d were performed in a double wall, two liter steel reactor, which was purged with nitrogen, before the addition of organic solvent, monomers, polar coordinator compound, initiator compound, or other components. The polymerization reactor was tempered to 55° C., unless stated otherwise. The following components were than added in the following order: cyclohexane solvent (500 grams); tetramethylethylene diamine (TMEDA) as polar coordinator compound, butadiene monomer, and the mixture was allowed to stir for one hour. N-butyl lithium was added to start the polymerization reaction. The polymerization was performed at 55° C. for approximately 45 minutes, after which, the polymer solution of experiment 1 was removed from the reactor, and separately worked up as described below. In case of experiment 1a, 1b, 1c and 1d, the modifier M6 (used as end modifier compound), M3 (used as end modifier compound), M1 (used as a modified coupling agent) or M9 (used as a modified coupling agent) was added. Subsequently the polymer solution was stirred for additional 45 minutes at 55° C. For Examples 1, no modifier was added, as indicated above. For the termination of the polymerization process, the polymer solution was transferred, after one hour, into a separate double wall, steel reactor, containing 50 mL methanol, and Irganox 1520 as stabilizer for the polymer (one liter of methanol contained two grams of Irganox). This mixture was stirred for 15 minutes. The polymerization solvent and other volatiles were then removed via vacuum.

TABLE 1

SEC Characterizations of Final Polymer, and Amount of Components used in Polymerization**

| Ex. | Modifier | Mw [g/mol] | Mn [g/mol] | Mw/Mn | Modifier (moles) | Styrene (moles) | butadiene (moles) | TMEDA (moles) | n-butyl lithium (moles) |
|---|---|---|---|---|---|---|---|---|---|
| 1  | none | 43000 | 41800 | 1.04 | —    | 0 | 1 | 5 | 1.95 |
| 1a | M6   | 35200 | 33700 | 1.04 | 0.95 | 0 | 1 | 5 | 1.95 |
| 1b | M3   | 44.000 | 37600 | 1.17 | 0.95 | 0 | 1 | 5 | 1.95 |
| 1c | M1   | 68600 | 55800 | 1.23 | 0.3  | 0 | 1 | 5 | 1.95 |
| 1d | M9   | 86300 | 73500 | 1.17 | 0.3  | 0 | 1 | 5 | 1.95 |

*wt % of the total polymer weight
**GPC - Method B

TABLE 2

SEC Characterizations of Final Polymer**

| Ex. | Modifier | Mp1[a] [g/mol]/ wt %* | Mp2[b] [g/mol]/ wt %* | Mp3[c] [g/mol]/ wt %* | Mp4[d] [g/mol]/ wt %* | Mp5[e] [g/mol]/ wt %* | "Larger than Mp5"[f] [g/mol]/ wt %* | Detected Portion[g] wt %* |
|---|---|---|---|---|---|---|---|---|
| 1  | none | 43000/98.4 | n.d./1.6   | —/—         | —/—        | —/—        | —/—       | 94 |
| 1a | M6   | 34000/97.6 | 70000/2.4  | —/—         | —/—        | —/—        | —/—       | 93 |
| 1b | M3   | 34000/74.6 | 67000/21.9 | 106000/3.0  | n.d./0.5   | —/—        | —/—       | 91 |
| 1c | M1   | 32000/22.3 | 63000/30.0 | 93000/40.0  | 124000/3.6 | 150000/3.2 | n.d./0.6  | 98 |
| 1d | M9   | 48000/26.0 | 94000/52.4 | 143000/11.4 | n.d./1.8   | n.d./0.8   | n.d./0.8  | 95 |

*is wt % of the total polymer weight
**GPC - Method B
[a] polymer base molecular weight (uncoupled polymer)
[b] two polymer chains coupled
[c] three polymer chains coupled
[d] four polymer chains coupled
[e] five polymer chains coupled
[f] six or more polymer chains coupled
[g] is the soluble fraction of total weight of polymer sample, which was analyzed by SEC

Homopolymerization of 1,3-Butadiene

Examples 2a, 2b and 2c, 2d

Polymerizations for Examples 2a, 2b and 2c, 2d were performed in a double wall, two liter steel reactor, which was purged with nitrogen, before the addition of organic solvent, monomers, polar coordinator compound, initiator compound or other components. The polymerization reactor was tempered to 50° C., unless stated otherwise. The following components were than added in the following order: cyclohexane solvent (500 grams); tetramethylethylene diamine (TMEDA) (45.0 mmol) as polar coordinator compound, butadiene monomer, and the mixture was allowed to stir for one hour. N-butyl lithium (50.0 mmol) was added to start the polymerization reaction. The polymerization was performed at 50° C. for approximately 2 hours, after which time, a part of the polymer solution (66.6 wt % or 50 wt %) was removed from the reactor, and separately worked up as described below. Subsequently, the modified coupling agent M1, or the end modification agent M2, was added. Subsequently the polymer solution was stirred for an additional 45 minutes at 50° C. For Examples 2b and 2d, no modifier was added. For the termination of the polymerization process, the polymer solution was transferred, after one hour, into a separate double wall, steel reactor, containing 50 mL methanol, and Irganox 1520 as stabilizer for the polymer (one liter of methanol contained two grams of Irganox). This mixture was stirred for 15 minutes. The polymerization solvent and other volatiles were then removed via vacuum.

Examples 2a & 2b

The polymerization reaction (for Example 2a) was performed using 54.1 g (1.00 mol) butadiene. After the removal of 66.6 wt % of the polymer solution, 5.91 grams (25.0 mmol) of modified coupling agent M1 was added to the polymerization reactor. The same preparation was used for Example 2b, except that no modifier was added. The final polymer is characterized in Table 3.

Examples 2c & 2d

The polymerization reaction was performed using 10.0 g (0.185 mol) butadiene. After the removal of 50 wt % of the polymer solution, 12.5 mmol of end-modification agent M2 was added to the polymerization reactor. The same preparation was used for Example 2d, except that no modifier was added. The final polymer is characterized in Table 3.

GC-MS investigation of Example 2a confirmed the existence of trimethyl silyl groups (—$SiMe_3$) (m/e=73), exemplary in three different polymer fractions, at retention times of 13.17 minutes, 13.25 minutes and 22.04, respectively. The (—$SiMe_3$) fragment was found in the majority of the polymer fractions, indicating the existence of at least one (—$SiMe_3$) group in the majority of the polymer chains As a separate study, an effective removal of the (—$SiMe_3$) protective group was demonstrated by first preparing hexadecyl-trimethylsilyl-sulfide, followed by the removal of (—$SiMe_3$) group with HCl. More specifically, 5.1 g (20 mmol) hexadecylthiol was dissolved in 25 mL cyclohexane. Triethylamine (2.15 g (21.25 mmol)) was then added, followed by 4.47 g (41.25 mmol) chloro-trimethyl-silane in 25 mL cyclohexane. The resulting reaction mixture was stirred for 24 hours, and than heated at 60° C. for three hours. The resulting solution was filtrated, and the cyclohexane solvent removed via vacuum. Hexadecyl-trimethylsilyl-sulfide was formed (yield: 6.6 g (20.0 mmol)). The (—$SiMe_3$) group was confirmed via NMR spectroscopy (signal appeared in the $^1$H-NMR spectra at 0.23 ppm). Hexadecyl-trimethylsilyl-sulfide (1 gram (mmol)) was dissolved in 15 mL cyclohexane, and hydrochloric acid (2 grams, 36%) in 10 mL ethanol was added, and the mixture was stirred for 15 hours at room temperature. After removal of the organic layer through phase separation and extraction, the organic phase was dried using magnesium sulfate and filtrated. Removal of the organic solvent, and most of the formed hexachlorodisiloxane side product, via vacuum, led to the isolation of hexadecylthiol. As expected, the (—$SiMe_3$) signal in the $^1$H-NMR spectra at 0.23 ppm disappeared, and a new (—$SiMe_3$) signal of very low intensity at 0.13 ppm appeared, indicating the presence of a hexachlorodisiloxane side product.

Copolymerization of 1,3-Butadiene with Styrene

Examples 2-25

The co-polymerizations were performed in a double wall, 20 liter steel reactor, which was first purged with nitrogen, before the addition of organic solvent, monomers, polar coordinator compound, initiator compound or other components. The polymerization reactor was tempered to 60° C., unless stated otherwise. The following components were than added in the following order: cyclohexane solvent (9000 grams); butadiene monomer, styrene monomer, tetramethylethylene diamine (TMEDA), and the mixture was stirred for one hour, followed by titration with n-butyl lithium to remove traces of

TABLE 3

SEC Characterizations, 1H NMR Characterizations, and Elemental Analysis on Final Polymer***

| Ex. | Modifier | Mw [g/mol] | Mn [g/mol] | —S content [mmol/g polybutadiene]* | —OMe content [mol %]** | —$SiMe_3$ content [mmol/g polybutadiene]** |
|---|---|---|---|---|---|---|
| 2a | M1 | 4,560 | 3,460 | 0.20 | 0.0 | 0.17 |
| 2b | — | 2,350 | 2,080 | 0.0 | 0.0 | 0.0 |
| 2c | M2 | 930 | 575 | 0.83 | 0.1 | 0.89 |
| 2d | — | 520 | 430 | 0.0 | 0.0 | 0.0 |

*Elemental Analysis for Sulfur (X-Ray Fluorescence Spectroscopy)
**1 H NMR Spectroscopy
***GPC - Method B moisture or other impurities. Additional n-butyl lithium was added as to start the polymerization reaction. The polymerization was performed for 80 minutes, not allowing the polymerization temperature to exceed 60° C. Afterwards, 0.5% of the total butadiene monomer amount was added, followed by the addition of the modified coupling agent (1 or 2). The mixture was stirred for 20 minutes. Subsequently, 1.8% of the total butadiene monomer amount was added, followed by the addition of modifier (3 or 4), unless stated otherwise. For the termination of the polymerization process, the polymer solution was transferred, after 45 minutes, into a separate double wall, steel reactor, containing 100 mL ethanol, 1.4 g of concentrated HCl (concentration 36%), and 5 g Irganox 1520 as stabilizer for the polymer. This mixture was stirred for 15 minutes. The resulting polymer solution was than stripped with steam for one hour to remove solvent and other volatiles, and dried in an oven at 70° C. for 30 minutes, and than additionally for one to three days, at room temperature.

The resulting polymer composition and several attributes are summarized in Tables 4 and 5 below. Unless otherwise stated, quantities are expressed in mmols. Examples prepared under identical polymerization conditions (in the same polymerization reactor, on the same day, by the same operator) are designated with identical letters adjacent to the Example number (e.g. 3A, 4A).

The use of a dash "-" in the tables below indicates that no constituent was added. The abbreviation "N.M." is intended to mean that no measurement was taken, or that corresponding data was unavailable.

TABLE 4

Composition of Examples - amounts of reagents for polymerization

| Example | Modified Chain-End Modifier mmole | Modified coupling agent mmole | butadiene (moles) | styrene (moles) | TMEDA (moles) | n-butyl lithium (moles) |
|---|---|---|---|---|---|---|
| 4A  | (6) 3.736  | [TTC** 0.314]  | 13.01 | 1.81  | 8.92 | 4.45  |
| 6A  | (6) 3.750  | (9) 0.492      | 13.07 | 1.82  | 8.95 | 4.48  |
| 7B  | —          | [TMS* 0.805]   | 12.46 | 2.16  | 10.6 | 2.85  |
| 8B  | (6) 1.721  | (9) 0.560      | 12.45 | 2.16  | 10.6 | 2.85  |
| 9B  | —          | [TMS* 0.548]   | 12.49 | 2.16  | 10.6 | 2.88  |
| 10B | (6) 1.718  | (9) 0.773      | 12.45 | 2.16  | 10.6 | 2.85  |
| 11B | (6) 1.715  | [TMS* 0.548]   | 12.44 | 2.17  | 10.6 | 2.85  |
| 12B | —          | [TMS* 0.617]   | 12.49 | 2.17  | 10.6 | 2.95  |
| 13C | —          | [TMS* 0.748]   | 12.49 | 2.16  | 10.6 | 2.89  |
| 14C | (6) 1.743  | (9) 0.542      | 12.43 | 2.16  | 10.6 | 2.88  |
| 16D | (6) 18.395 | (9) 2.110      | 38.75 | 17.12 | —    | 21.58 |
| 17D | —          | [TTC** 1.319]  | 38.75 | 17.13 | —    | 21.71 |
| 18D | (6) 18.539 | [TMS* 1.650]   | 38.76 | 17.12 | —    | 21.60 |
| 19E | (5) 3.729  | [TTC** 0.311]  | 12.98 | 1.80  | 8.9  | 4.65  |
| 20E | (5) 3.798  | (8) 0.492      | 13.09 | 1.81  | 8.9  | 4.61  |
| 21E | —          | (8) 0.493      | 13.11 | 1.83  | 9.0  | 4.26  |
| 22F | (6) 3.762  | [TTC** 0.305]  | 12.97 | 1.81  | 8.9  | 4.52  |
| 23F | (6) 4.062  | (9) 0.489      | 13.07 | 1.81  | 8.9  | 4.39  |
| 24F | —          | (9) 0.493      | 13.02 | 1.82  | 9.0  | 4.39  |
| 25G | (2) 3.75   | (1) 0.483      | 13.08 | 1.81  | 8.9  | 4.39  |

*TMS . . . tetramethoxysilane - unmodified coupling agent reference
**TTC . . . tin tetrachloride - unmodified coupling agent reference

TABLE 5

Polymer Characterizations***

| Example | Mw [g/mol] | Mn [g/mol] | Mpl [g/mol] | Coupling Rate$^A$ [%] | Mooney* viscosity [MU] | Mooney** Viscosity [MU] | Vinyl content$^B$ [wt %] | Styrene content$^C$ [wt %] |
|---|---|---|---|---|---|---|---|---|
| 4A  | 448,941 | 307,714 | 294,845 | 26.1 | 61.9  | —         | 62.2 | 21.1 |
| 6A  | 396,650 | 396,650 | 301,100 | 21.5 | 56.6  | —         | 62.7 | 21.2 |
| 7B  | 883,641 | 564,021 | 486,639 | 67.6 | 99.1  | 56.1/57.1 | 63.4 | 25.5 |
| 8B  | 634,978 | 428,467 | 454,694 | 31.9 | 111.7 | 44.9      | 62.7 | 25.4 |
| 9B  | 821,021 | 520,703 | 489,100 | 46.3 | 113.3 | 49.8/52.0 | 63.1 | 25.1 |
| 10B | 713,009 | 484,391 | 482,052 | 41.3 | 97.3  | 51.1/51.1 | 62.7 | 25.4 |
| 11B | 793,762 | 486,161 | 471,442 | 46.0 | 101.9 | 50.9/51.0 | 63.5 | 25.0 |
| 12C | 730,267 | 450,966 | 459,609 | 40.1 | 115.2 | 47.2/46.4 | 63.4 | 25.5 |
| 13C | 827,078 | 495,543 | 458,524 | 54.3 | 113.8 | 50.3/52.1 | 64.2 | 25.2 |
| 14C | 627,864 | 412,785 | 466,989 | 30.0 | 110.5 | 45.2/44.7 | 63.9 | 25.2 |

TABLE 5-continued

Polymer Characterizations***

| Example | Mw [g/mol] | Mn [g/mol] | Mpl [g/mol] | Coupling Rate[A] [%] | Mooney* viscosity [MU] | Mooney** Viscosity [MU] | Vinyl content[B] [wt %] | Styrene content[C] [wt %] |
|---|---|---|---|---|---|---|---|---|
| 16D | 389,014 | 277,564 | 251,986 | 26.3 | 73.2 | — | 9.3 | 46.1 |
| 17D | 405,288 | 277,365 | 251,980 | 25.6 | 69.8 | — | 9.1 | 46.3 |
| 18D | 275,061 | 251,005 | 251,005 | 25.3 | 70.4 | — | 9.3 | 46.4 |
| 19E | 497,407 | 340,527 | 319,565 | 28.9 | 71.9 | — | 62.1 | 21.4 |
| 20E | 420,519 | 317,495 | 305,233 | 27.1 | 64.9 | — | 63.0 | 21.1 |
| 21E | 384,200 | 295,457 | 292,683 | 19.78 | 57.6 | — | 62.7 | 21.2 |
| 22F | 455,789 | 314,113 | 296,572 | 26.14 | 61.4 | — | 63.6 | 21.0 |
| 23F | 374,015 | 294,987 | 293,535 | 20.41 | 63.1 | — | 62.3 | 21.3 |
| 24F | 494,901 | 290,534 | 294,665 | 19.04 | 57.2 | — | 62.7 | 21.1 |
| 25G | 366,865 | 361,276 | 291,557 | 49.13 | 82.1 | — | 62.1 | 21.2 |

*Mooney viscosity of oil free grade
**Mooney viscosity of TDAE oil containing grade
***GPC - Method A
[A]Determined by SEC
[B]Vinyl content is that of the 1,2-polybutadiene unit content of the final copolymer, and is determined by IR Spectroscopy
[C]Styrene content of the final copolymer, and is determined by IR Spectroscopy The total styrene block content percentage for each of Examples 4-14 was ≤1 mole percent (based on total amount of styrene in copolymer as determined by 1H NMR).

Polymer Compositions

Polymer compositions were prepared by combining and compounding the constituents listed below in Table 6, in a 350 cc Banbury mixer, and vulcanized at 160° C. for 20 minutes. Vulcanization process data and physical properties for the each elastomeric composition example are provided in Tables 7 and 8.

TABLE 6

Polymer Composition using Respective Polymer 12C to 14C of Table 5

| Constituent | Amount (phr)* |
|---|---|
| Elastomeric polymer Example (styrene butadiene copolymer) | 100 |
| IRB 7 (international ref. carbon black, Sid Richardson) | 50 |

TABLE 6-continued

Polymer Composition using Respective Polymer 12C to 14C of Table 5

| Constituent | Amount (phr)* |
|---|---|
| Stearic acid | 0.73 |
| Zinc oxide | 2.18 |
| Vulcanization Package: | |
| Sulfur | 1.25 |
| CBS (N-cyclohexyl-2-benzothiazylsulfenamid; VULCACIT CZ/EG, Bayer AG) | 0.98 |

*based on weight of styrene butadiene copolymer

TABLE 7

Vulcanization Process Data of Compositions of Table 6

| Ex* | End Modifier | Modified Coupling Agent | TS 1 [min] | TS 2 [min] | TC 50 [min] | TC 90 [min] | Heat Build Up [° C.] | DIN Abrasion 0.5 kg load [mm] |
|---|---|---|---|---|---|---|---|---|
| 12C | — | — | 5.0 | 7.9 | 11.0 | 18.4 | 86.0 | 190 |
| 13C | — | — | 4.6 | 7.7 | 10.9 | 18.3 | 87.9 | 173 |
| 14C | 6 | 9 | 5.2 | 7.7 | 10.5 | 17.9 | 87.4 | 196 |

*Respective polymer from Table 5 used in the polymer composition of Table 6

TABLE 8

Properties of Vulcanized Compositions of Table 6

| Ex* | End Modifier | Modified Coupling Agent | Elongation at Break [%] | Tensile Strength [MPa] | Modulus 300 [MPa] | Tan δ at 0° C. | Tan δ at 60° C. | Temp, at Tan δ max [° C.] |
|---|---|---|---|---|---|---|---|---|
| 12C | — | — | 495 | 19.1 | 11.0 | 0.6573 | 0.1220 | −10 |
| 13C | — | — | 493 | 19.8 | 11.2 | 0.6101 | 0.1323 | −10 |
| 14C | 6 | 9 | 483 | 19.3 | 11.2 | 0.6409 | 0.1158 | −10 |

*Respective polymer from Table 5 used in the polymer composition of Table 6

Additional polymer compositions were prepared by combining and compounding the respective constituents listed below in Tables 9, 10 and 11, in a 350 cc Banbury mixer, and vulcanized at 160° C. for 20 minutes. Vulcanization process data and physical properties for the each elastomeric composition example are provided in Tables 12 and 13.

TABLE 9

Polymer Composition using Respective Polymer 4A or 6A of Table 5

| Constituent | Amount (phr)* |
|---|---|
| Elastomeric polymer Example (styrene butadiene copolymer) | 80 |
| High cis 1,4-polybutadiene (BUNA CIS 132-Schkopau, Dow Olefinverbund GmbH) | 20 |
| Precipitated silica (ULTRASIL 7000 GR, Degussa-Hüls AG) | 80 |
| Silane (NXT Silane, GE Beyer Silicones) | 9.7 |
| Stearic acid | 1.0 |
| Antiozonant (DUSANTOX 6 PPD (N-(1,3-dimethyl-butyl)-N'-phenyl-p-phenyllendiamin) Duslo) | 2.0 |
| Zinc oxide | 2.5 |
| Ozone protecting wax (ANITLUX 654, Rhein Chemie Rheinau GmbH) | 1.5 |
| Softener (TDAE Oil) ENERDEX 65 | 20 |
| Vulcanization Package: | |
| Sulfur | 1.4 |
| CBS (N-cyclohexyl-2-benzothiazylsulfenamid; VULCACIT CZ/EG, Bayer AG) | 1.5 |
| DPG (diphenylguanidin, VULKACIT D, Lanxess Deutschland GmbH) | 1.5 |

*based on sum weight of the styrene butadiene copolymer and high cis 1,4-polybutadiene

TABLE 10

Polymer Composition using Respective Polymer 7B to 11B of Table 5

| Constituent | Amount (weight parts) |
|---|---|
| Elastomeric polymer Example (styrene butadiene copolymer) | 117.5 |
| High cis 1,4-polybutadiene (BUNA CIS 132-Schkopau, Dow Olefinverbund GmbH) | 20.0 |
| Precipitated silica (ULTRASIL 7000 GR, Degussa-Hüls AG) | 80.00 |
| Silane (NXT Silane, GE Beyer Silicones) | 9.7 |
| Stearic acid | 1.00 |
| Antiozonant (VANOX 6 PPD (N-(1,3-dimethyl-butyl)-N'-phenyl-p-phenyllendiamin) Duslo) | 2.00 |
| Zinc oxide | 2.50 |
| Ozone protecting wax (ANITLUX 654, Rhein Chemie Rheinau GmbH) | 1.50 |
| Vulcanization Package: | |
| Sulfur | 1.40 |
| CBS (N-cyclohexyl-2-benzothiazylsulfenamid; VULCACIT CZ/EG, Bayer AG) | 1.70 |
| DPG (diphenylguanidin, VULKACIT D, Lanxess Deutschland GmbH) | 2.00 |

TABLE 11

Polymer Composition using Respective Polymer 12C to 14C of Table 5

| Constituent | Amount (weight parts) |
|---|---|
| Elastomeric polymer Example (styrene butadiene copolymer) | 117.5 |
| High cis 1,4-polybutadiene (BUNA CIS 132-Schkopau, Dow Olefinverbund GmbH) | 20 |
| Precipitated silica (ULTRASIL 7000 GR, Degussa-Hüls AG) | 80 |
| Silane (NXT Silane, GE Beyer Silicones) | 9.7 |
| Stearic acid | 1.0 |
| Antiozonant (DUSANTOX 6 PPD (N-(1,3-dimethyl-butyl)-N'-phenyl-p-phenyllendiamin) Duslo) | 2.0 |
| Zinc oxide | 2.5 |
| Ozone protecting wax (ANITLUX 654, Rhein Chemie Rheinau GmbH) | 1.5 |
| Vulcanization Package: | |
| Sulfur | 1.40 |
| CBS (N-cyclohexyl-2-benzothiazylsulfenamid; VULCACIT CZ/EG, Bayer AG) | 1.70 |
| DPG (diphenylguanidin, VULKACIT D, Lanxess Deutschland GmbH) | 2.0 |

TABLE 12

Vulcanization Process Data of Compositions of Tables 9-11

| Ex* | End Modifier | Modified Coupling Agent | TS 1 [min] | TS 2 [min] | TC 50 [min] | TC 90 [min] | Heat build up [° C.] | DIN Abrasion 0.5 kg load [mm] |
|---|---|---|---|---|---|---|---|---|
| 4A | 6 | — | 3.4 | 4.0 | 5.6 | 14.8 | 94.6 | 85 |
| 6A | 6 | 9 | 3.5 | 4.2 | 6.0 | 15.5 | 94.5 | 93 |
| 7B | — | — | 2.6 | 3.4 | 4.7 | 11.8 | 92.6 | 106 |
| 8B | 6 | 9 | 3.1 | 4.0 | 5.4 | 12.5 | 95.7 | 72 |
| 9B | — | — | 2.9 | 3.8 | 5.3 | 13.2 | 89.0 | 92 |
| 10B | 6 | 9 | 3.1 | 4.0 | 5.5 | 12.8 | 85.6 | 74 |
| 11B | 6 | — | 2.8 | 3.7 | 5.1 | 13.34 | 90.5 | 112 |
| 12C | — | — | 2.8 | 3.6 | 5.1 | 12.6 | 96.1 | 73 |
| 13C | — | — | 2.9 | 3.8 | 5.1 | 12.7 | 93.3 | 104 |
| 14C | 6 | 9 | 2.9 | 3.8 | 5.2 | 12.2 | 87.0 | 78 |

*Respective polymer from Table 5 used in the polymer composition of Table 9, 10 or 11

TABLE 13

Properties of Vulcanized Compositions of Tables 9-11

| Ex* | End Modifier | Modified Coupling Agent | Elongation at Break [%] | Tensile Strength [MPa] | Modulus 300 [MPa] | Tan δ at 0° C. | Tan δ at 60° C. | Temp, at Tan δ max [° C.] |
|---|---|---|---|---|---|---|---|---|
| 4A | 6 | — | 498 | 20.4 | 9.2 | 0.2461 | 0.1093 | −21.95 |
| 6A | 6 | 9 | 474 | 20.4 | 9.7 | 0.2594 | 0.1019 | −21.95 |
| 7B | — | — | 629 | 20.4 | 6.8 | 0.2731 | 0.1238 | −20 |
| 8B | 6 | 9 | 615 | 21.0 | 7.2 | 0.2984 | 0.1003 | −18 |
| 9B | — | — | 601 | 19.1 | 6.8 | 0.2814 | 0.1263 | −20 |
| 10B | 6 | 9 | 598 | 20.7 | 7.2 | 0.2871 | 0.0981 | −20 |
| 11B | 6 | — | 512 | 17.0 | 7.4 | 0.2873 | 0.1107 | −20 |
| 12C | — | — | 564 | 19.4 | 7.6 | 0.2966 | 0.1244 | −20 |
| 13C | — | — | 562 | 20.0 | 7.8 | 0.2993 | 0.1222 | −20 |
| 14C | 6 | 9 | 545 | 20.1 | 7.6 | 0.3019 | 0.1019 | −20 |

*Respective polymer from Table 5 used in the polymer composition of Table 9, 10 or 11

One important application of the present invention is the production of elastomeric polymer compositions having lower "Tan δ at 60° C." values, without negatively impacting other physical properties and processability, particularly "Tan δ at 0° C." Tire treads made from elastomeric polymer compositions having lower "Tan δ at 60° C." values have corresponding lower rolling resistance, while those with higher "Tan δ at 0° C." values have corresponding better wet skid properties.

As means of illustrating the invention, living low molecular weight polybutadienes were used as a relatively simple model polymer. As shown in Table 3, polybutadienes of Examples 2b and 2d had molecular weights ($M_w$) of 2,350 and 520 g/mol, respectively. These polymers did not contain modified polymer chains, that is, neither trimethylsilyl (—SiMe$_3$) nor methoxy (—OMe) groups where present. Similar polymers (Examples 2a and 2c) were prepared, and modified with Modifiers M1 and M2, pursuant to the subject invention. This modification resulted in the modification of polymer chains via the methoxy-silyl groups of the modifiers. As expected, few methoxy groups were detected in the $^1$H-NMR spectra. Both the investigation of Example 2c by GC-MS analysis, and the investigation of Example 2a by pyrolysis-MS analysis, lead to the identification of a trimethylsilyl (—SiMe$_3$) group as a fragment in the mass spectra at m/e=73.2.

In order to demonstrate the an effective removal of trimethylsilyl group from a trimethylsilylsulfido-group modified polymer, hexadecyl-trimethylsilyl-sulfide was selected as a model compound. As demonstrated above, hexadecyl-trimethylsilyl-sulfide was transformed quantitatively into hexadecylthiol, after the exposure to hydrochloric acid at room temperature. It is believed that the existence of the trimethylsilyl group temporarily prevents (that is, protects) the inactivation of a substantial amount of living polymer chain ends through reaction.

In order to demonstrate the different structure of polymer macromolecules formed by using modified coupling agents and end-modification agents, the experiments 1, 1a, 1b, 1c and 1d in Table 1 and 2 were carried out.

Polybutadienes of experiments 1c and 1d, formed by using modified coupling agents M1 and M9, indicate a higher coupling degree, in comparison with experiments 1a and 1b, prepared by using end modification agent M6 and M3. When modified coupling agents M1 or M9 were used as terminating agent in polymerization experiments 1c and 1d, 76.8 and 69.2 wt % of polymer macromolecules were formed, comprising more than one polymer arm. When modification agents M6 and M3 were used as terminating agent in polymerization experiments 1a and 1b, 2.5 and 24.9 weight percent of polymer macromolecules were formed comprising more than one polymer arm.

The results mentioned above, indicate that the formation of polymer macromolecules comprising one polymer arm, and one functionality derived from the end-modification agent M6 and M3, is clearly preferred. This preference is particularly interesting due to the stoichiometric ratio of initiator compound and thus of "the formed living polymer chains" to "the end-modification agent" of two to one. This ratio rather suggests the formation of polymer macromolecules comprising two polymer arms and one functionality derived from the end-modification agent M6 and M3, which however is only observed in a relatively low amount. On the other hand, the use of modified coupling agents, such as, for example, M1 and M9, leads preferably to polymer macromolecules comprising two or more polymer arms, and one functionality derived from the modifying coupling agent. Thus, the different functionalization agents, particularly the modified coupling agent and the end modification agent, can be used to produce essentially modified branched polymer molecules (as defined above) in one process step, and modified essentially linear "one polymer arm comprising polymer molecules" in another process step.

The combination of both technologies, modifying polymer chain coupling and polymer chain-end modification, in the course of the preparation of a polymer, leads to a polymer blend containing hardly unmodified polymer macromolecules. Compared with a traditional polymer preparation, inventive processes combining the following: A) the use of classical coupling agents, such as, for example, silicon or tin tetrachloride or tetraalkoxytin or -silicon compounds, with B) an chain-end-modification agent, provides an increased degree of polymer modification, and in improved performance in the corresponding polymer vulcanizate.

As previously stated, one significant application for the subject modified elastomeric polymers is their use in preparing elastomeric polymer compositions, and which are specifically used tire treads, and which have low rolling resistance, as represented by compositions having relatively low values for Tan δ at 60° C., without significantly deterioration of wet skid properties, as represented by Tan δ at 0° C. As illustrated in Table 13, polymer compositions prepared from elastomeric polymers modified by using modified coupling agents and end-modification agents, according to the present invention (that is, with modified coupling agent 9 and end-modification agent 6), had relatively lower "Tan δ at 60° C." values and higher "Tan δ at 0° C." values, as compared to their counterpart examples (designated by the same letter, for example, 8B, 9B and 10B), prepared without using an modified coupling agent, or without using both an modified coupling agent and a end-modification agent. Tensile Strength, Modulus 300, and Elongation at Break of the modified Examples were improved, or at least not significantly deteriorated.

As shown in Table 8, heat build up during dynamic deformation of the vulcanizate is reduced by use of the subject modified elastomeric polymers. This reduction is believed to improve the durability of the resulting composition and to increase overall elasticity. Tensile Strength and Modulus 300 are not deteriorated in comparison to the reference polymer, suggesting the formation of a stable polymer network with a higher resistance under mechanical stress. Although Elongation at Break values are slightly reduced, they are still very acceptable considering the improved Tan δ values.

Tables 7 and 12 show that scorch times (TS) and times to cure (TC) are comparable with unmodified polymers, and thus the corresponding polymer compositions have good processability.

It is particularly advantageous that aforementioned benefits were generally found with both carbon black containing polymer compositions, as well as with silica containing polymer compositions, though the stronger effect was observed for silica containing polymer compositions.

In addition, it is advantageous that the aforementioned benefits were generally found, when according to the invention, modified oil extended high molecular weight polymers were used as polymer source in carbon black and silica containing polymer compositions.

The invention claimed is:

1. An elastomeric polymer composition comprising the reaction product of at least the following:
   i) a living anionic elastomeric polymer;
   ii) a silane modifier compound represented by the Formula 1 or Formula 2:

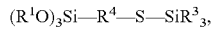

$(R^1O)_3Si\text{—}R^4\text{—}S\text{—}SiR^3{}_3,$   Formula 1

$(R^{13}O)_3Si\text{—}R^9\text{—}N(SiR^{10}R^{11}R^{12})_2$   Formula 2 wherein:
   Si is silicon; S is sulfur; O is oxygen; N is nitrogen;
   $R^4$ and $R^9$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl); and wherein each alkyl may be linear or branched, and saturated or unsaturated;
   $R^1, R^3, R^{10}, R^{11}, R^{12}$ and $R^{13}$ are the same or different, and are each, independently, selected from hydrogen (H), a ($C_1$-$C_{16}$) alkyl, a ($C_6$-$C_{16}$) aryl, a ($C_7$-$C_{16}$) aralkyl or a ($C_3$-$C_{30}$) tri(hydrocarbyl)silyl, and wherein the hydrocarbyl groups are each, independently, selected from a ($C_1$-$C_{16}$) alkyl, a ($C_6$-$C_{16}$) aryl, or a ($C_7$-$C_{16}$) aralkyl;
   iii) a modifier compound represented by one of the following Formulas 3 to 6:

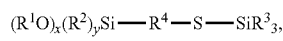

$(R^1O)_x(R^2)_ySi\text{—}R^4\text{—}S\text{—}SiR^3{}_3,$   Formula 3

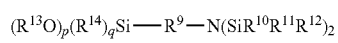

$(R^{13}O)_p(R^{14})_qSi\text{—}R^9\text{—}N(SiR^{10}R^{11}R^{12})_2$   Formula 4

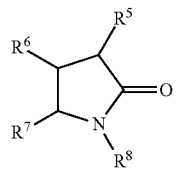

Formula 5

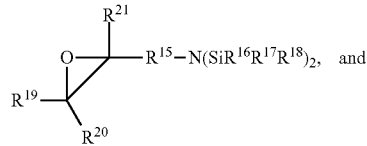

Formula 6 wherein:
Si is silicon; S is sulfur; O is oxygen; N is nitrogen,
x and p are an integer selected from 1, and 2;
y and q are an integer selected from 1, and 2;
x+y=3; p+q=3;
$R^4, R^9$ and $R^{15}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl); and wherein each alkyl may be linear or branched, and saturated or unsaturated;
$R^1, R^2, R^3, R^5, R^6, R^7, R^8, R^{10}, R^{11}, R^{12}, R^{13}, R^{14}, R^{16}, R^{17}, R^{18}, R^{19}, R^{20},$ and $R^{21}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein
the hydrocarbyl groups are each independently selected from a ($C_1$-$C_{16}$) alkyl, a ($C_6$-$C_{16}$) aryl, or a ($C_7$-$C_{16}$) aralkyl.

2. The composition of claim 1, wherein the living anionic elastomeric polymer (Component i) and the silane modifier compound (Component ii) are first reacted to form a modified polymer, and the modified polymer is then reacted with the modifier compound (Component iii).

3. The composition of claim 1, wherein the silane modifier (Component ii) is the compound of Formula 1.

4. The composition of claim 1, wherein the silane modifier (Component ii) is the compound of Formula 2.

5. The composition of claim 1, wherein the elastomeric polymer is selected from the group consisting of styrene-butadiene copolymers, polybutadiene, butadiene-isoprene copolymers, polyisoprene and butadiene-styrene-isoprene terpolymers.

6. The composition of claim 1, further comprising a filler.

7. The composition of claim 1, further comprising a vulcanization agent.

8. The composition of claim 6, further comprising at least one polymer is selected from the group consisting of styrene-butadiene copolymers, polybutadiene, butadiene-isoprene copolymers, polyisoprene, butadiene-styrene-isoprene terpolymers, and combinations thereof.

9. An article comprising at least one component formed from the composition of claim 1.

10. The article of claim 9, wherein the article is a tire.

11. An elastomeric polymer composition comprising the reaction product of at least the following: 1) a filler; 2) the elastomeric polymer composition of claim 1.

12. The composition of claim 11, wherein the living anionic elastomeric polymer (Component i) and the silane modifier (Component ii) are first reacted to form a modified polymer, and the modified polymer is then reacted with the modifier (Component iii).

13. The composition of claim 11, wherein the silane modifier (Component ii) is the compound of Formula 1.

14. The composition of claim 11, wherein the silane modifier (Component ii) is the compound of Formula 2.

15. The composition of claim 11, wherein the elastomeric polymer is selected from the group consisting of styrene-butadiene copolymers, polybutadiene, butadiene-isoprene copolymers, polyisoprene and butadiene-styrene-isoprene terpolymers.

16. An article comprising at least one component formed from the composition of claim 11.

17. A vulcanized elastomeric polymer composition comprising the reaction product of at least the following:
   1) a filler;
   2) a vulcanization agent; and
   3) the elastomeric polymer composition of claim 1.

18. The vulcanized composition of claim 17, wherein the living anionic elastomeric polymer (Component i) and the silane modifier (Component ii) are first reacted to form a modified polymer, and the modified polymer is then reacted with the modifier (Component iii).

19. The vulcanization composition of claim 17, wherein the silane modifier (Component ii) is the compound of Formula 1.

20. The vulcanization composition of claim 17, wherein the silane modifier (Component ii) is the compound of Formula 2.

21. An article comprising at least one component formed from the composition of claim 17.

22. A composition comprising at least the following:
   i) a living anionic elastomeric polymer;
   ii) a silane modifier compound represented by the Formula 1 or Formula 2:

   $(R^1O)_3Si\text{—}R^4\text{—}S\text{—}SiR^3_3$, Formula 1

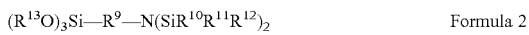
   $(R^{13}O)_3Si\text{—}R^9\text{—}N(SiR^{10}R^{11}R^{12})_2$ Formula 2 wherein:
   Si is silicon; S is sulfur; O is oxygen; N is nitrogen;
   $R^4$ and $R^9$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl); and wherein each alkyl may be linear or branched, and saturated or unsaturated;
   $R^1$, $R^3$, $R^{10}$, $R^{11}$, $R^{12}$ and $R^{13}$ are the same or different, and are each, independently, selected from hydrogen (H), a ($C_1$-$C_{16}$) alkyl, a ($C_6$-$C_{16}$) aryl, a ($C_7$-$C_{16}$) aralkyl or a ($C_3$-$C_{30}$) tri(hydrocarbyl)silyl, and wherein the hydrocarbyl groups are each, independently, selected from a ($C_1$-$C_{16}$) alkyl, a ($C_6$-$C_{16}$) an aryl, or a ($C_7$-$C_{16}$) aralkyl; and
   iii) a modifier compound represented by one of the following Formulas 3 to 6:

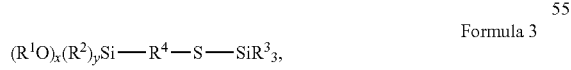
   $(R^1O)_x(R^2)_ySi\text{—}R^4\text{—}S\text{—}SiR^3_3$, Formula 3

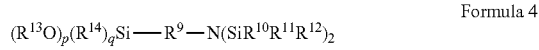
   $(R^{13}O)_p(R^{14})_qSi\text{—}R^9\text{—}N(SiR^{10}R^{11}R^{12})_2$ Formula 4

   Formula 5

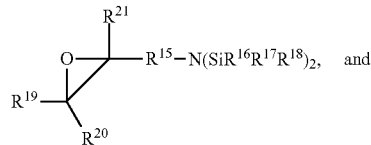
Formula 6 wherein:
Si is silicon; S is sulfur; O is oxygen; N is nitrogen,
x and p are an integer selected from 1, and 2;
y and q are an integer selected from 1, and 2;
x+y=3; p+q=3;
$R^4$, $R^9$ and $R^{15}$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl); and wherein each alkyl may be linear or branched, and saturated or unsaturated;
$R^1$, $R^2$, $R^3$, $R^5$, $R^6$, $R^7$, $R^8$, $R^{10}$, $R^{11}$, $R^{12}$, $R^{13}$, $R^{14}$, $R^{16}$, $R^{17}$, $R^{18}$, $R^{19}$, $R^{20}$, and $R^{21}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, or a ($C_7$-$C_{16}$) aralkyl.

23. The composition of claim 22, wherein the silane modifier (Component ii) is the compound of Formula 1.

24. The composition of claim 22, wherein the silane modifier (Component ii) is the compound of Formula 2.

25. The composition of claim 22, wherein the elastomeric polymer is selected from the group consisting of styrene-butadiene copolymers, polybutadiene, butadiene-isoprene copolymers, polyisoprene, and butadiene-styrene-isoprene terpolymers.

26. An article comprising at least one component formed from the composition of claim 22.

27. A method for making an elastomeric polymer composition, comprising the following:
   A) reacting at least the following constituents to form a modified polymer:
      i) a living anionic elastomeric polymer, and
      ii) a silane modifier compound represented by the Formula 1 or Formula 2:

   $(R^1O)_3Si\text{—}R^4\text{—}S\text{—}SiR^3_3$, Formula 1

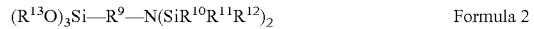
   $(R^{13}O)_3Si\text{—}R^9\text{—}N(SiR^{10}R^{11}R^{12})_2$ Formula 2 wherein:
   Si is silicon; S is sulfur; O is oxygen; N is nitrogen;
   $R^4$ and $R^9$ are the same or different, and each is independently a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl); and wherein each alkyl may be linear or branched, and saturated or unsaturated;
   $R^1$, $R^3$, $R^{10}$, $R^{11}$, $R^{12}$ and $R^{13}$ are the same or different, and are each, independently, selected from hydrogen (H), a ($C_1$-$C_{16}$) alkyl, a ($C_6$-$C_{16}$) an aryl, a ($C_7$-$C_{16}$) aralkyl or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) an aryl, or a ($C_7$-$C_{16}$) aralkyl;
   B) reacting the modified polymer with at least the following to form the elastomeric polymer:
      iii) a modifier compound represented by one of the following Formulas 3 to 6:

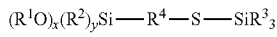  Formula 3

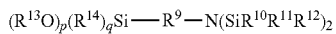  Formula 4

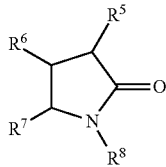  Formula 5

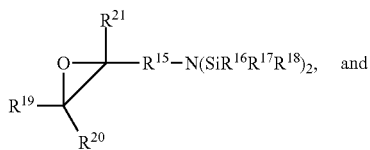  and  Formula 6 wherein:
Si is silicon; S is sulfur; O is oxygen; N is nitrogen,
x and p are an integer selected from 1, and 2;
y and q are an integer selected from 1, and 2;
x+y=3; p+q=3;
$R^4$, $R^9$ and $R^{15}$ are the same or different, and each is independently a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl); and wherein each alkyl may be linear or branched, and saturated or unsaturated;

$R^1, R^2, R^3, R^5, R^6, R^7, R^8, R^{10}, R^{11}, R^{12}, R^{13}, R^{14}, R^{16}, R^{17}, R^{18}, R^{19}, R^{20}$, and $R^{21}$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri(hydrocarbyl)silyl, and wherein the hydrocarbyl groups are each independently selected from a $(C_1-C_{16})$ alkyl, a $(C_6-C_{16})$ aryl, or a $(C_7-C_{16})$ aralkyl.

28. A method for making a vulcanized elastomeric polymer composition comprising the steps of reacting at least the following constituents: 1) a filler; 2) a vulcanization agent; and 3) the elastomeric polymer composition of claim 1.

29. The composition of claim 1, wherein the silane modifier (Component ii) is the compound of Formula 1 and modifier compound (Component iii) is the compound of Formula 3.

30. The composition of claim 11, wherein the silane modifier (Component ii) is the compound of Formula 1 and modifier compound (Component iii) is the compound of Formula 3.

31. The composition of claim 17, wherein the silane modifier (Component ii) is the compound of Formula 1 and modifier compound (Component iii) is the compound of Formula 3.

32. The composition of claim 17, wherein the silane modifier (Component ii) is the compound of Formula 2 and modifier (Component iii) is the compound of Formula 3.

* * * * *